US010488072B2

(12) United States Patent
Yajima et al.

(10) Patent No.: US 10,488,072 B2
(45) Date of Patent: Nov. 26, 2019

(54) AIR CONDITIONING SYSTEM WITH LEAK PROTECTION CONTROL

(71) Applicant: DAIKIN INDUSTRIES, LTD., Osaka-shi, Osaka (JP)

(72) Inventors: Ryuuzaburou Yajima, Osaka (JP); Tsutomu Iura, Osaka (JP); Yasuyuki Aisaka, Osaka (JP); Taiki Sunahata, Osaka (JP); Daisuke Noburyuu, Osaka (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 13 days.

(21) Appl. No.: 15/551,527

(22) PCT Filed: Feb. 3, 2016

(86) PCT No.: PCT/JP2016/053232
§ 371 (c)(1),
(2) Date: Aug. 16, 2017

(87) PCT Pub. No.: WO2016/132906
PCT Pub. Date: Aug. 25, 2016

(65) Prior Publication Data
US 2018/0045424 A1  Feb. 15, 2018

(30) Foreign Application Priority Data

Feb. 18, 2015 (JP) .................................. 2015-029983
Apr. 30, 2015 (JP) .................................. 2015-093550

(51) Int. Cl.
*F24F 11/00*  (2018.01)
*F24F 11/83*  (2018.01)
(Continued)

(52) U.S. Cl.
CPC .............. *F24F 11/83* (2018.01); *F24F 7/007* (2013.01); *F24F 11/30* (2018.01); *F24F 11/62* (2018.01);
(Continued)

(58) Field of Classification Search
CPC ............................ F24F 11/36; F24F 2221/32
See application file for complete search history.

(56) References Cited

U.S. PATENT DOCUMENTS

| | | | |
|---|---|---|---|
| 2013/0014525 A1 | 1/2013 | Koge et al. | |
| 2013/0098576 A1 | 4/2013 | Fujitaka et al. | |
| 2015/0330646 A1* | 11/2015 | Matsumoto | F24F 11/30 700/276 |

FOREIGN PATENT DOCUMENTS

| | | |
|---|---|---|
| CN | 2233533 Y | 8/1996 |
| CN | 1825012 A | 8/2006 |

(Continued)

*Primary Examiner* — Jonathan Bradford
(74) *Attorney, Agent, or Firm* — Birch, Stewart, Kolasch & Birch, LLP

(57) ABSTRACT

An air conditioning system has an air conditioner, which includes an outdoor unit and an indoor unit that configure a refrigerant circuit, and a controller, which controls the running of the air conditioner. The controller does not allow operation of the air conditioner to start in a case where a signal from a ventilation unit that includes a ventilation fan for ventilation and ventilates a target space or a refrigerant leak sensor that detects refrigerant leakage in the target space is not input to the controller. Because of this, even in a configuration where an air conditioner and a ventilation unit are installed independently of each other, operation of the air conditioner can be performed in a state in which there is reliably established a countermeasure such as the ventilation unit being operated when the refrigerant has leaked, and safety and security with respect to refrigerant leakage are reliably ensured.

20 Claims, 12 Drawing Sheets

(51) Int. Cl.
*F24F 11/89* (2018.01)
*F25B 49/02* (2006.01)
*F24F 7/007* (2006.01)
*F24F 11/62* (2018.01)
*F24F 11/77* (2018.01)
*F24F 11/30* (2018.01)
*F24F 11/63* (2018.01)
*F24F 11/36* (2018.01)
*F24F 11/58* (2018.01)

(52) U.S. Cl.
CPC .............. *F24F 11/77* (2018.01); *F24F 11/89* (2018.01); *F25B 49/02* (2013.01); *F24F 11/36* (2018.01); *F24F 11/58* (2018.01); *F24F 11/63* (2018.01); *F24F 2221/32* (2013.01)

(56) References Cited

FOREIGN PATENT DOCUMENTS

| | | |
|---|---|---|
| CN | 202119010 U | 1/2012 |
| CN | 202188563 U | 4/2012 |
| EP | 1 083 392 A2 | 3/2001 |
| EP | 1 473 524 A2 | 11/2004 |
| JP | 60-7538 U | 1/1985 |
| JP | 4-309744 A | 11/1992 |
| JP | 2001-74283 A | 3/2001 |
| JP | 2003-227662 A | 8/2003 |
| JP | 2005-49001 A | 2/2005 |
| JP | 2008-267795 A | 11/2008 |
| JP | 2010-255900 A | 11/2010 |
| WO | WO 2011/141959 A1 | 11/2011 |
| WO | WO 2012/001847 A1 | 1/2012 |

* cited by examiner

GROUPING TABLE TB1

| | VARIABLE | VALUE |
|---|---|---|
| INDOOR UNIT 30a | UNIT NUMBER | 1 |
| | GROUP NUMBER | 1 |
| | DEVICE TYPE | 1 |
| INDOOR UNIT 30b | UNIT NUMBER | 2 |
| | GROUP NUMBER | 1 |
| | DEVICE TYPE | 1 |
| INDOOR UNIT 30c | UNIT NUMBER | 3 |
| | GROUP NUMBER | 2 |
| | DEVICE TYPE | 1 |
| INDOOR UNIT 30d | UNIT NUMBER | 4 |
| | GROUP NUMBER | 2 |
| | DEVICE TYPE | 1 |
| VENTILATION UNIT 40a | UNIT NUMBER | 5 |
| | GROUP NUMBER | 1 |
| | DEVICE TYPE | 2 |
| VENTILATION UNIT 40b | UNIT NUMBER | 6 |
| | GROUP NUMBER | 2 |
| | DEVICE TYPE | 2 |
| FIRST REFRIGERANT LEAK SENSOR 60a | UNIT NUMBER | 7 |
| | GROUP NUMBER | 1 |
| | DEVICE TYPE | 3 |
| SECOND REFRIGERANT LEAK SENSOR 60b | UNIT NUMBER | 8 |
| | GROUP NUMBER | 2 |
| | DEVICE TYPE | 3 |

FIG. 6

AIR CONDITIONING SYSTEM WITH LEAK PROTECTION CONTROL

TECHNICAL FIELD

The present invention relates to an air conditioning system including an air conditioner that cools or heats a target space by causing refrigerant to circulate in a refrigerant circuit during operation.

BACKGROUND ART

Conventionally, a configuration has been proposed where, as in Patent Document 1 (JP-A No. 2001-74283), an indoor unit of an air conditioner having a refrigerant circuit through which a combustible refrigerant circulates, a ventilation fan (a ventilation unit), and a sensor (a refrigerant leak sensor) that detects combustible gas are installed in a room (a target space), and when leakage of the combustible refrigerant has been detected, the ventilation unit is operated to thereby discharge the combustible refrigerant from the target space.

SUMMARY OF INVENTION

Here, in a case of configuring an air conditioning system to cool, heat, and ventilate a target space by installing an air conditioner and a ventilation unit in a building such as a multistoried building, there are many cases where the air conditioner and the ventilation unit are actually installed independently of each other. That is, there are various types of ventilation units, such as a type having a fan such as a ventilation fan, a type having a total heat exchanger for waste heat recovery, and a type having a combination humidifier-dehumidifier for humidification and dehumidification, and the ventilation unit is selected independently of the air conditioner in accordance with the needs of the user, so there are many cases where the air conditioner and the ventilation unit are installed independently of each other by different contractors at the installation site.

However, even in a case where the air conditioner and the ventilation unit are selected and installed independently of each other, in order to prevent an oxygen deficiency accident, an ignition accident (if the refrigerant is mildly flammable or combustible), or a poisoning accident (if the refrigerant is toxic) in the target space from occurring because of leakage of the refrigerant from the air conditioner, it is important to perform ventilation when the refrigerant has leaked, to ensure that the oxygen deficiency concentration, the flammable concentration, or the toxicity limit concentration is not exceeded in the target space. However, when the air conditioner and the ventilation unit are selected and installed independently of each other, sometimes the installation work is performed by different contractors, and a case is also conceivable where the connection of the electrical communication system between devices including the refrigerant leak sensor is not done reliably. In this case, ventilation when refrigerant leakage has occurred does not be reliably performed.

That is, in a configuration where the air conditioner and the ventilation unit are installed independently of each other, there is the concern that operation of the air conditioner will be performed without there being established a countermeasure such as the ventilation unit being operated when the refrigerant has leaked, and there is the problem that the potential for an accident caused by leakage of the refrigerant from the air conditioner to occur cannot be eliminated.

Therefore, it is an object of the present invention to provide an air conditioning system having superior safety and security.

An air conditioning system pertaining to a first aspect of the present invention comprises an air conditioner and an air conditioning control component. The air conditioner includes an outdoor unit and an indoor unit. The indoor unit configures a refrigerant circuit together with the outdoor unit. The indoor unit is installed in a target space. The air conditioner cools or heats the target space by causing refrigerant to circulate in the refrigerant circuit during operation. The air conditioning control component controls the running of the air conditioner. The air conditioning control component does not allow operation of the air conditioner to start in a case where a signal from a ventilation unit that includes a ventilation fan for ventilation and ventilates the target space or a refrigerant leak sensor that detects refrigerant leakage in the target space is not input to the air conditioning control component.

In the air conditioning system pertaining to the first aspect of the present invention, by establishing a state in which the signal from the ventilation unit or the refrigerant leak sensor is input to the air conditioning control component, it is ensured that connection of an electrical communication system between devices including the refrigerant leak sensor is reliably done at the installation site.

Because of this, even in a configuration where the air conditioner and the ventilation unit are installed independently of each other, operation of the air conditioner can be performed in a state in which there is reliably established a countermeasure such as the ventilation unit being operated when the refrigerant has leaked, and safety and security with respect to refrigerant leakage are reliably ensured.

It should be noted that the "case where a signal . . . is not input" includes a case where, when the ventilation unit or the refrigerant leak sensor has a communication function, there is a communication abnormality between the ventilation unit and the air conditioning control component or between the refrigerant leak sensor and the air conditioning control component. Furthermore, the "case where a signal . . . is not input" also includes a case where there is a break in the line between the ventilation unit and the air conditioning control component or between the refrigerant leak sensor and the air conditioning control component.

Furthermore, examples of the refrigerant used in the "refrigerant circuit" here include a mildly flammable refrigerant such as R32, a combustible refrigerant such as propane, or a toxic refrigerant such as ammonia.

An air conditioning system pertaining to a second aspect of the present invention is the air conditioning system pertaining to the first aspect, further comprising a ventilation control component. The ventilation control component is electrically connected to the ventilation unit. The ventilation control component controls the running of the ventilation unit. In a state in which the running of the ventilation unit is controllable, the ventilation control component sends a notification signal to the air conditioning control component. In a case where the air conditioning control component does not receive the notification signal, the air conditioning control component considers this to be a case where the signal from the ventilation unit is not input, and does not allow operation of the air conditioner to start.

In the air conditioning system pertaining to the second aspect of the present invention, in a state in which the running of the ventilation unit is controllable, the ventilation control component sends the notification signal to the air conditioning control component, and in a case where the air conditioning control component does not receive the notification signal, the air conditioning control component does not allow operation of the air conditioner to start. Because of this, the notification signal is not sent to the air conditioning control component in a case where the ventilation unit is not properly installed in the target space, a case where communication between the ventilation unit and the ventilation control component is not performed normally, or a case where the ventilation unit does not run mechanically normally. As a result, operation of the air conditioner is done only in a case where the running of the ventilation control component is controllable, regardless of whether or not the ventilation unit is installed independently of the air conditioner in the target space. That is, in a situation where it is not envisioned that ventilation will be reliably performed when refrigerant leakage has occurred, operation of the air conditioner is not done. Consequently, safety and security with respect to refrigerant leakage are reliably ensured.

It should be noted that the "case where the air conditioning control component does not receive the notification signal" includes a case where the air conditioning control component does not receive the notification signal because the notification signal is not sent from the ventilation control component and a case where the air conditioning control component cannot normally receive the notification signal despite the fact that the notification signal is being sent from the ventilation control component.

An air conditioning system pertaining to a third aspect of the present invention is the air conditioning system pertaining to the second aspect, wherein the ventilation unit further includes a drive component and a frame. The drive component drives the ventilation fan. The frame retains the ventilation fan. The ventilation control component is configured separately from the ventilation unit.

The air conditioning system pertaining to the third aspect of the present invention becomes easily applicable even in a post-installation air conditioning system. That is, because the ventilation control component is configured separately from the ventilation unit, the air conditioning system pertaining to the third aspect is configured by newly adding the ventilation control component in the post-installation air conditioning system. That is, versatility is improved.

An air conditioning system pertaining to a fourth aspect of the present invention is the air conditioning system pertaining to the second aspect or the third aspect, wherein the ventilation unit further includes a drive voltage supply component and a connection terminal. The drive voltage supply component supplies a drive voltage for the ventilation fan. The connection terminal is electrically connected to the ventilation control component. The ventilation control component outputs a control signal to the ventilation unit. The drive voltage supply component supplies the drive voltage on the basis of the control signal that has been input via the connection terminal.

The air conditioning system pertaining to the fourth aspect of the present invention becomes more easily applicable in the post-installation air conditioning system. That is, because the ventilation unit includes the drive voltage supply component and the connection terminal, it becomes easy to newly add the ventilation control component in the post-installation air conditioning system. Thus, versatility is further improved.

An air conditioning system pertaining to a fifth aspect of the present invention is the air conditioning system pertaining to the second aspect or the third aspect, wherein the ventilation unit is supplied with drive power from a commercial power supply. The ventilation control component includes a switch component. The switch component is disposed on a power supply line. The power supply line interconnects the ventilation unit and the commercial power supply. The switch component switches between electrically connecting and disconnecting the power supply line.

The air conditioning system pertaining to the fifth aspect of the present invention becomes more easily applicable in the post-installation air conditioning system. That is, it becomes easy to newly add the ventilation control component without being limited to the model of the ventilation unit in the post-installation air conditioning system. Thus, versatility is further improved.

An air conditioning system pertaining to a sixth aspect of the present invention is the air conditioning system pertaining to any of the second aspect to the fifth aspect, wherein the air conditioning control component sends an electrical signal to the ventilation control component. The ventilation control component controls the running of the ventilation unit on the basis of the electrical signal it has received.

Because of this, it becomes possible to control the running of the ventilation unit remotely using an existing transmission path of the air conditioner (e.g., a communication line interconnecting the indoor unit and a remote controller), and it becomes possible to ensure safety and security while suppressing cost.

An air conditioning system pertaining to a seventh aspect of the present invention is the air conditioning system pertaining to the sixth aspect, wherein by sending the electrical signal the air conditioning control component controls the running of the ventilation unit in conjunction with the running of the indoor unit associated with the ventilation unit.

Because of this, it becomes possible to operate the ventilation unit in conjunction with the running of the air conditioner in accordance with the situation. Thus, convenience is improved.

An air conditioning system pertaining to an eighth aspect of the present invention is the air conditioning system pertaining to the seventh aspect, wherein the air conditioning system has a plurality of the indoor units and/or the ventilation units and further comprises a general control component. The general control component generally controls the running of the plural indoor units and/or the plural ventilation units. Each of the ventilation units is installed in the same target space as any of the indoor units. The general control component divides the plural indoor units and/or the plural ventilation units into plural groups. The general control component collectively controls the indoor units and the ventilation units by each of the groups.

Because of this, it becomes possible to generally control the indoor units and the ventilation units. Thus, convenience is further improved.

Furthermore, in a multi-room air conditioner having plural indoor units, sometimes an indoor unit and a ventilation unit are installed in each predetermined area of a target space, and the air conditioner operates in conjunction with the ventilation units. For example, in a case where, in an office, no workers are present outside working hours, sometimes the air conditioner and the ventilation unit are shut down in conjunction with each other in order to save energy.

However, even in a configuration where the multi-room air conditioner and the ventilation unit are operated in conjunction with each other, the air conditioner and the ventilation unit are themselves devices capable of being installed independently of each other and operated. That is, in a case where connection of the electrical communication system between both devices is performed, both devices can be operated in conjunction with each other as needed, but in a case where connection of the electrical communication system between both devices is not performed, both devices can only be operated independently of each other and not in conjunction with each other. In this way, considering that the multi-room air conditioner and the ventilation unit are selected and installed independently of each other, when leakage of the refrigerant from the air conditioner has been detected, even if a configuration is employed which operates the ventilation unit to discharge the refrigerant from the target space, there is the concern that at the installation site a situation will arise where connection of the electrical communication system between the devices including the refrigerant leak sensor is not reliably done. For this reason, in a configuration where the multi-room air conditioner and the ventilation unit are installed independently of each other, there is the concern that operation of the air conditioner will be performed without there being established a countermeasure such as the ventilation unit being operated when the refrigerant has leaked, and there is the problem that the potential for an accident caused by the leakage of the refrigerant from the air conditioner will be unable to be eliminated.

To address this, in the air conditioning system pertaining to the eighth aspect, safety and security are reliably ensured even in a configuration where the multi-room air conditioner having the plural indoor units and the ventilation unit are installed independently of each other.

An air conditioning system pertaining to a ninth aspect of the present invention is the air conditioning system pertaining to any of the second aspect to the eighth aspect, wherein the ventilation control component sends the notification signal by wireless communication.

Because of this, it becomes possible to easily construct a communication network in the target space.

An air conditioning system pertaining to a tenth aspect of the present invention is the air conditioning system pertaining to any of the second aspect to the ninth aspect, wherein the air conditioning control component and the ventilation control component are electrically connected to each other by a communication line. The communication line configures a transmission path of the notification signal.

Because of this, it becomes possible to construct a communication network using an existing communication line of the air conditioner (e.g., a communication line interconnecting the indoor unit and a remote controller) in the target space. Thus, it becomes possible to ensure safety and security while suppressing cost.

BRIEF DESCRIPTION OF DRAWINGS

FIG. 6 is a schematic diagram showing an example of a grouping table.

DESCRIPTION OF EMBODIMENT

An air conditioning system 100 pertaining to an embodiment of the present invention will be described. It should be noted that the following embodiment is a specific example of the present invention, is not intended to limit the technical scope of the present invention, and is capable of being appropriately changed in a range that does not depart from the spirit of the present invention.

(1) Air Conditioning System 100

Figure 1:
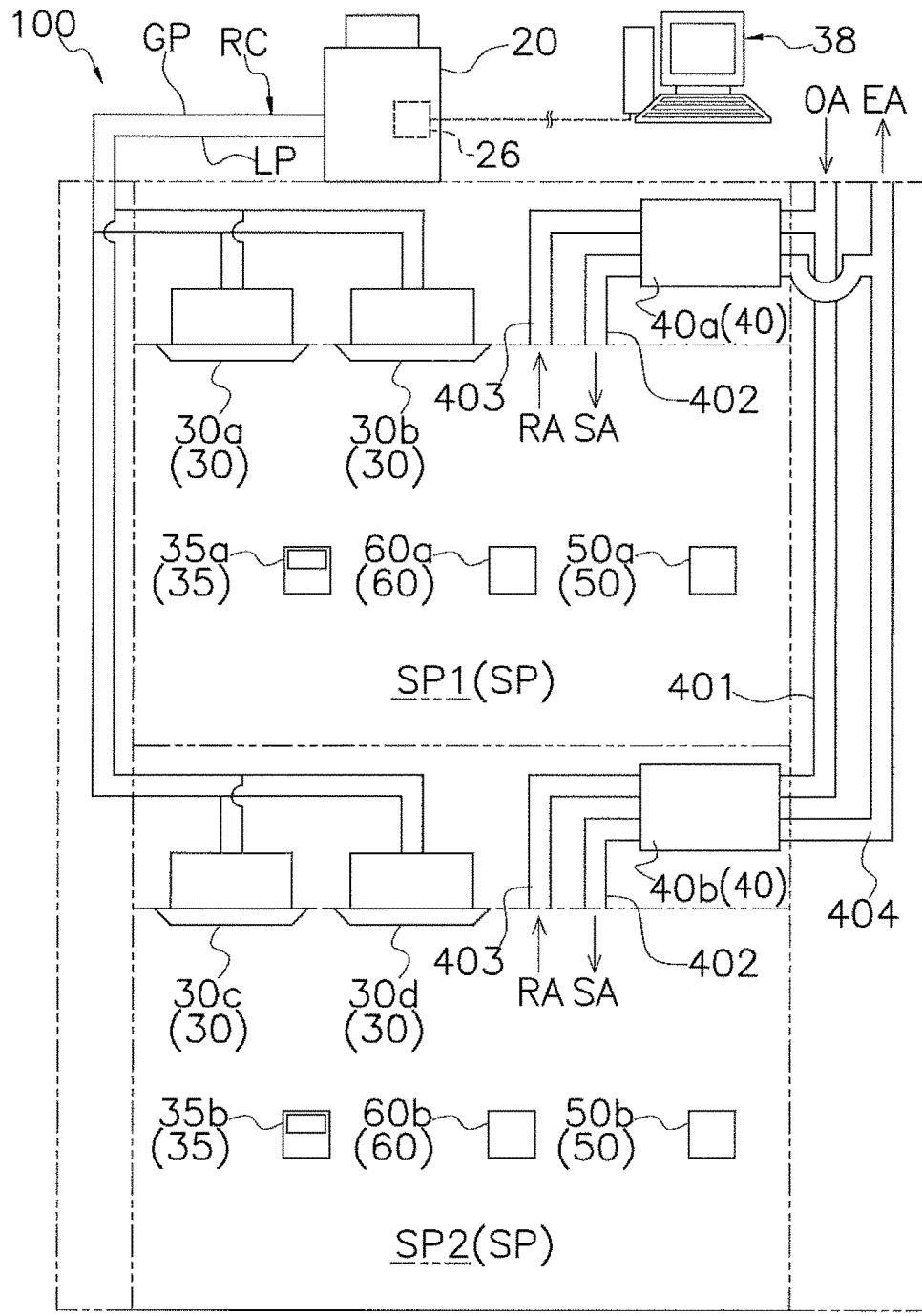
FIG. 1 is a general configuration diagram of an air conditioning system pertaining to an embodiment of the present invention.
Figure 2:
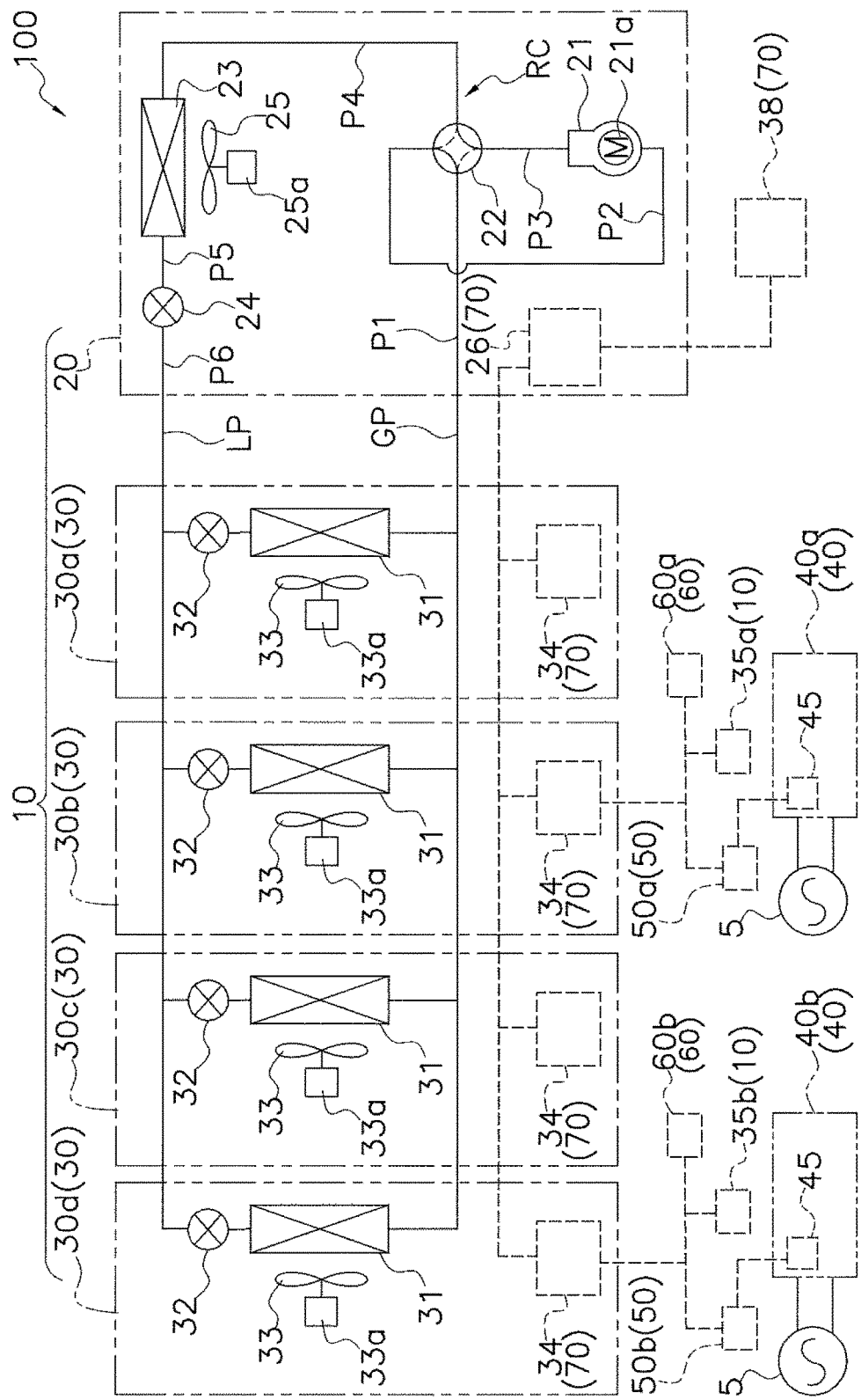
FIG. 2 is a schematic diagram showing a refrigerant circuit and a transmission path configured in the air conditioning system.

FIG. 1 is a general configuration diagram of the air conditioning system 100 pertaining to the embodiment of the present invention. FIG. 2 is a schematic diagram showing a refrigerant circuit RC and a transmission path configured in the air conditioning system 100.

The air conditioning system 100 is a system that is installed in a multistoried building or a factory, for example, and realizes air conditioning such as cooling, heating, and ventilation of a target space. In the present embodiment, the air conditioning system 100 air-conditions plural target spaces SP (SP1 and SP2).

The air conditioning system 100 mainly has an air conditioner 10, which cools or heats the target spaces SP, and plural ventilation units 40. Furthermore, the air conditioning system 100 has plural adapter units 50 (ventilation control components), plural refrigerant leak sensors 60, and a controller 70 (an air conditioning control component, a general control component) that generally controls the running of the air conditioning system 100.

It should be noted that in the present embodiment a case will be described where the air conditioning system 100 is configured using the air conditioner 10 and the ventilation units 40 already installed in the target spaces SP. Specifically, the air conditioning system 100 is configured by additionally installing the adapter units 50 in the target spaces SP in which the air conditioner 10 and the ventilation units 40 are installed.

(1-1) Air Conditioner 10

The air conditioner 10 includes the refrigerant circuit RC and cools or heats the target spaces SP (SP1 and SP2) by causing refrigerant to circulate in the refrigerant circuit RC to thereby perform vapor compression refrigeration cycles.

The air conditioner 10 is mainly equipped with one outdoor unit 20 that serves as a heat source unit, plural (here, four) indoor units 30 that serve as utilization units, plural (here, two) remote controllers 35 that serve as input devices for inputting commands, and a central management device 38 that generally controls the running of the outdoor unit 20 and the indoor units 30.

It should be noted that in the present embodiment two indoor units 30 and one remote controller 35 are disposed in each target space SP. Specifically, indoor units 30a and 30b and a remote controller 35a are disposed in the target space SP1, and indoor units 30c and 30d and a remote controller 35b are disposed in the target space SP2.

In the air conditioner 10, the refrigerant circuit RC is configured as a result of the outdoor unit 20 and the indoor units 30 being interconnected by a gas intercommunication pipe GP and a liquid intercommunication pipe LP.

A mildly flammable refrigerant such as R32, a combustible refrigerant such as propane, or a toxic refrigerant such as ammonia, for example, is contained as the refrigerant in the refrigerant circuit RC.

(1-1-1) Outdoor Unit 20

The outdoor unit 20 is installed outdoors. The outdoor unit 20 mainly has plural refrigerant pipes (a first pipe P1 to a sixth pipe P6), a compressor 21, a four-way switching valve 22, an outdoor heat exchanger 23, an outdoor expansion valve 24, an outdoor fan 25, and an outdoor unit control component 26.

The first pipe P1 is a refrigerant pipe that interconnects the gas intercommunication pipe GP and the four-way switching valve 22. The second pipe P2 is a suction pipe that interconnects the four-way switching valve 22 and a suction port (not shown in the drawings) of the compressor 21. The third pipe P3 is a discharge pipe that interconnects a discharge port (not shown in the drawings) of the compressor 21 and the four-way switching valve 22. The fourth pipe P4 is a refrigerant pipe that interconnects the four-way switching valve 22 and the gas side of the outdoor heat exchanger 23. The fifth pipe P5 is a refrigerant pipe that interconnects the liquid side of the outdoor heat exchanger 23 and the outdoor expansion valve 24. The sixth pipe P6 is a refrigerant pipe that interconnects the outdoor expansion valve 24 and the liquid intercommunication pipe LP.

The compressor 21 is a mechanism that sucks in and compresses low-pressure gas refrigerant and then discharges the compressed refrigerant. The compressor 21 has a closed structure with a built-in compressor motor 21a. In the compressor 21, a rotary-type or scroll-type compression element (not shown in the drawings) housed inside a compressor casing (not shown in the drawings) is driven using the compressor motor 21a as a drive source. During operation, the compressor motor 21a is inverter-controlled and its rotational speed is adjusted in accordance with the situation. When driven, the compressor 21 sucks in refrigerant through the suction port, compresses the refrigerant, and then discharges the refrigerant through the discharge port.

The four-way switching valve 22 is a switching valve for switching the direction in which the refrigerant flows in the refrigerant circuit RC. The four-way switching valve 22 is individually connected to the first pipe P1, the second pipe P2, the third pipe P3, and the fourth pipe P4. During the cooling operation, the four-way switching valve 22 switches the flow path so as to interconnect the first pipe P1 and the second pipe P2 and interconnect the third pipe P3 and the fourth pipe P4 (see the solid lines of the four-way switching valve 22 in FIG. 2). Furthermore, during the heating operation, the four-way switching valve 22 switches the flow path so as to interconnect the first pipe P1 and the third pipe P3 and interconnect the second pipe P2 and the fourth pipe P4 (see the dashed lines of the four-way switching valve 22 in FIG. 1).

The outdoor heat exchanger 23 is a heat exchanger that functions as a refrigerant condenser or radiator during the cooling operation and functions as a refrigerant evaporator during the heating operation. The outdoor heat exchanger 23 includes heat transfer tubes (not shown in the drawings) through which the refrigerant flows and heat transfer fins (not shown in the drawings) that increase the heat transfer area. The outdoor heat exchanger 23 is disposed in such a way that, during operation, the refrigerant inside the heat transfer tubes and a flow of air generated by the outdoor fan 25 can exchange heat.

The outdoor expansion valve 24 is an electrically powered valve whose opening degree is adjustable. The outdoor expansion valve 24 functions as an expansion valve which, during the cooling operation, is completely opened and which, during the heating operation, reduces the pressure of the refrigerant in accordance with its opening degree.

The outdoor fan 25 is, for example, a propeller fan. The outdoor fan 25 is connected to an output shaft of an outdoor fan motor 25a and is driven in conjunction with the outdoor fan motor 25a. When the outdoor fan 25 is driven, the outdoor fan 25 generates a flow of air that flows from the outside into the outdoor unit 20, travels through the outdoor heat exchanger 23, and flows to the outside of the outdoor unit 20.

The outdoor unit control component 26 is a microcomputer configured by a CPU, a memory and the like. The outdoor unit control component 26 controls the running of actuators in the outdoor unit 20. The outdoor unit control component 26 is connected via a communication line to, and sends signals to and receives signals from, indoor unit control components 34 (described later) of the indoor units 30. Furthermore, the outdoor unit control component 26 is connected via a communication network such as a WAN or a LAN to, and sends signals to and receives signals from, the central management device 38. Furthermore, the outdoor unit control component 26 relays signals that are sent and received in communication between the indoor unit control components 34, the remote controllers 35 or the adapter units 50, and the central management device 38.

(1-1-2) Indoor Units 30

The indoor units 30 are, for example, ceiling-imbedded, ceiling-hung, or wall-mounted indoor units. The indoor units 30 configure the refrigerant circuit RC together with the outdoor unit 20. Each indoor unit 30 mainly has an indoor heat exchanger 31, an indoor expansion valve 32, an indoor fan 33, and an indoor unit control component 34.

The indoor heat exchanger 31 is a heat exchanger that functions as a refrigerant evaporator during the cooling operation and functions as a refrigerant condenser or radiator during the heating operation. The indoor heat exchanger 31 is a cross-flow finned-tube heat exchanger. The indoor heat exchanger 31 has one end connected to a refrigerant pipe extending to the indoor expansion valve 32 and another end connected to the gas intercommunication pipe GP. The indoor heat exchanger 31 is disposed in such a way that, during operation, the refrigerant inside the heat transfer tubes (not shown in the drawings) and a flow of air generated by the indoor fan 33 can exchange heat.

The indoor expansion valve 32 is an electrically powered valve whose opening degree is adjustable. The indoor expansion valve 32 is controlled to a minimum opening degree when operation of the indoor unit 30 is stopped. The indoor expansion valve 32 functions as an expansion valve which, during the cooling operation, reduces the pressure of the refrigerant in accordance with its opening degree, and is completely opened during the heating operation.

The indoor fan 33 is a propeller fan or a multi-blade fan, for example, and is connected to an output shaft of an indoor fan motor 33a. The indoor fan 33 is driven in conjunction with the indoor fan motor 33a. When the indoor fan 33 is driven, the indoor fan 33 generates a flow of air that flows into the indoor unit 30, travels through the indoor heat exchanger 31, and flows to the outside of the indoor unit 30.

The indoor unit control component 34 is a microcomputer configured by a CPU, a memory and the like. The indoor unit control component 34 controls the running of actuators in the indoor unit 30. Each indoor unit control component 34 sends signals to and receives signals from the outdoor unit control component 26 or the central management device 38. Furthermore, each indoor unit control component 34 communicates via a network NW with the corresponding remote controller 35 and adapter unit 50. Furthermore, each indoor unit control component 34 relays signals that are sent and received in communication between the corresponding remote controller 35 or adapter unit 50 and the outdoor unit control component 26 or the central management device 38.

It should be noted that in the present embodiment the network NW is a wired network configured by communication lines, and functions as a transmission path for electrical signals. Specifically, in the target space SP1 the network NW is constructed by a communication line CB1, and in the target space SP2 the network NW is constructed by a communication line CB2.

(1-1-3) Remote Controllers 35

The remote controllers 35 are user interfaces having input keys (not shown in the drawings) for inputting commands to the air conditioner 10 and a display (not shown in the drawings) that displays operating statuses. The remote controllers 35 send signals to and receive signals from, via the network NW, the indoor unit control components 34 of the indoor units 30 disposed in the same target spaces SP.

In the present embodiment, the remote controller 35a is connected by the communication line CB1 to the indoor unit control component 34 of the indoor unit 30b. Furthermore, the remote controller 35b is connected by the communication line CB2 to the indoor unit control component 34 of the indoor unit 30d.

Furthermore, the remote controllers 35 communicate with the outdoor unit control component 26, the central management device 38, or the adapter unit 50 as a result of signals being relayed by the indoor unit control components 34.

(1-1-4) Central Management Device 38

The central management device 38 is a computer that generally controls the running of the air conditioning system 100 including the air conditioner 10 and the plural ventilation units 40. The central management device 38 includes a CPU and memories such as a ROM, a RAM, and a flash memory. Furthermore, the central management device 38 includes an input component for the user to input commands and a display component that displays information to the user.

The central management device 38 is a server disposed in a monitoring room or a central management room away from the target spaces SP, for example. The central management device 38 sends signals to and receives signals from the outdoor unit control component 26. Furthermore, the central management device 38 communicates with the indoor unit control components 34, the remote controllers 35, or the adapter units 50 as a result of signals being relayed by the outdoor unit control component 26.

(1-2) Ventilation Units 40

Figure 3:
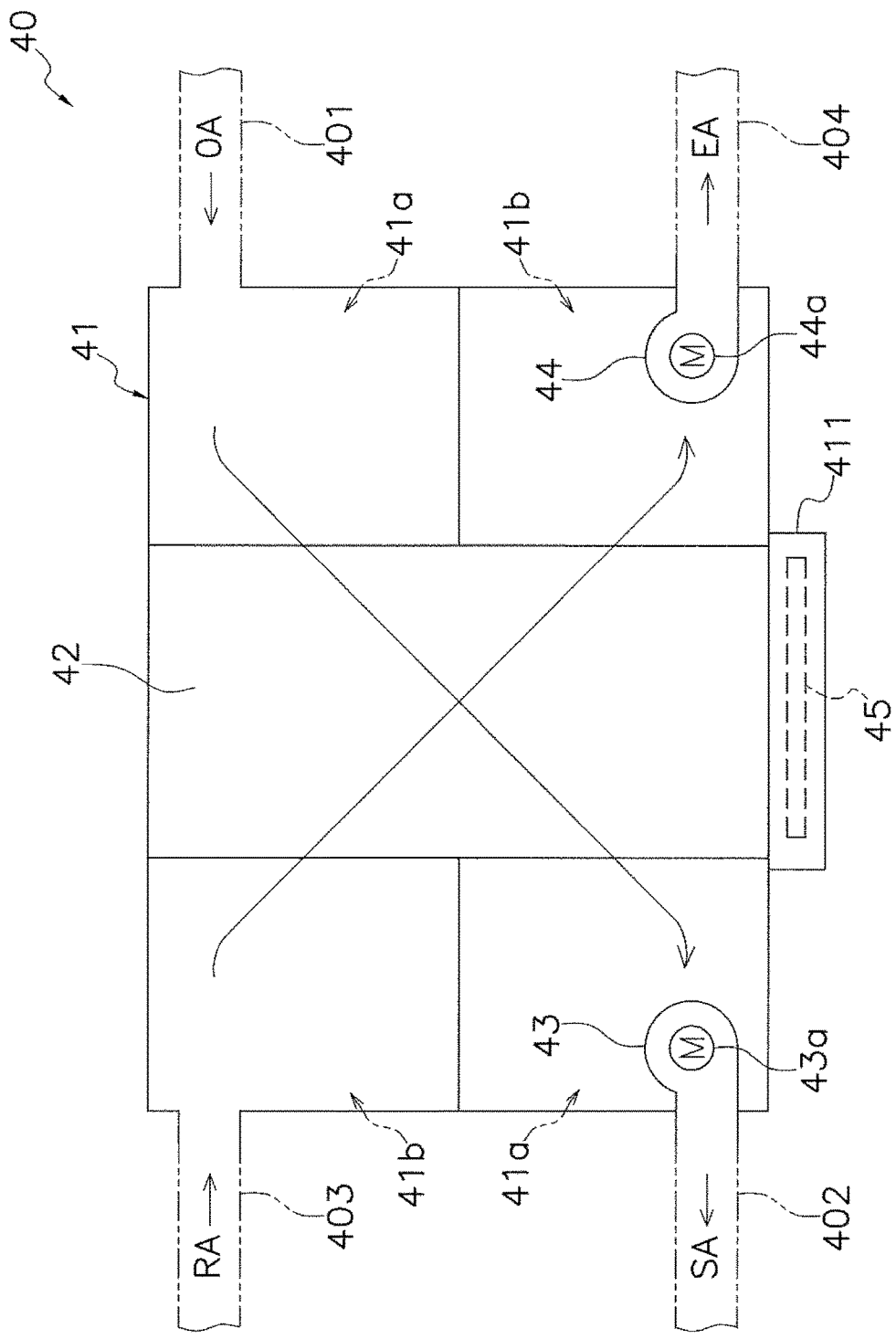
FIG. 3 is a general configuration diagram of a ventilation unit.

FIG. 3 is a general configuration diagram of the ventilation units 40. The ventilation units 40 ventilate the target spaces SP. The ventilation units 40 are installed independently of the air conditioner 10 in the target spaces SP (more specifically, in spaces behind ceilings of the target spaces SP). The ventilation units 40 are supplied with power from commercial power supplies 5.

The air conditioning system 100 has plural (here, two) ventilation units 40 (ventilation units 40a and 40b). The ventilation unit 40a is disposed in the target space SP1, and the ventilation unit 40b is disposed in the target space SP2.

Each ventilation unit 40 has plural ducts (an intake duct 401, a supply air duct 402, a removal duct 403, and an exhaust air duct 404). The intake duct 401 is connected to an intake port for taking outdoor air OA into the target space SP. The supply air duct 402 is connected to a supply air port that supplies the outdoor air OA as supply air SA. The removal duct 403 is connected to a removal port for removing room air RA from the target space SP. The exhaust air duct 404 is connected to a discharge port for discharging the room air RA as exhaust air EA to the outside.

Furthermore, each ventilation unit 40 has a body frame 41 (a frame), a heat exchanger 42, a supply air fan 43 (a ventilation fan) and an exhaust air fan 44 (a ventilation fan) for ventilation, and a fan drive control component 45 (a drive component, a drive voltage supply component).

The body frame 41 houses (retains) the supply air fan 43 and the exhaust air fan 44. Two air flow paths (a supply air flow path 41a and an exhaust air flow path 41b) partitioned from each other are formed inside the body frame 41. The supply air flow path 41a and the exhaust air flow path 41b are formed so as to cross the heat exchanger 42. The supply air flow path 41a has one end connected to the intake duct 401 and another end connected to the supply air duct 402. The supply air flow path 41a is an air flow path for allowing air to flow from the outside to the target space SP. The exhaust air flow path 41b has one end connected to the removal duct 403 and another end connected to the exhaust air duct 404. The exhaust air flow path 41b is an air flow path for allowing air to flow from the target space SP to the outside.

The heat exchanger 42 is a total heat exchanger that simultaneously exchanges sensible heat and latent heat between two flows of air (here, the room air RA and the outdoor air OA). The heat exchanger 42 is disposed inside the body frame 41 and is positioned on the two air flow paths 41a, 42a.

The supply air fan 43 generates a flow of air heading from the outside to the target space SP. The supply air fan 43 is a sirocco fan and includes a supply air fan motor 43a that is a drive component. The supply air fan 43 is disposed inside the body frame 41 and is positioned on the supply air flow path 41a.

The exhaust air fan 44 generates a flow of air heading from the target space SP to the outside. The exhaust air fan 44 is a sirocco fan and includes an exhaust air fan motor 44a that is a drive component. The exhaust air fan 44 is positioned on the exhaust air flow path 41b.

The fan drive control component 45 is a control component that controls the driving of the supply air fan 43 (the supply air fan motor 43a) and the exhaust air fan 44 (the exhaust air fan motor 44a). The fan drive control component 45 is housed inside an electrical component box 411 provided on the body frame 41. The fan drive control component 45 includes an inverter (not shown in the drawings), which supplies a drive voltage corresponding to a rotational speed to the supply air fan motor 43a and the exhaust air fan motor 44a, and a voltage deciding component (not shown in the drawings), which decides on the basis of the rotational speed (air volume) the voltage to be supplied. That is, in the ventilation unit 40 of the present embodiment, the rotational speeds of the supply air fan 43 and the exhaust air fan 44 are adjustable.

The fan drive control component 45 has a connection terminal 451 (see FIG. 4) for electrically connecting the fan drive control component 45 to an external device. One end side of a communication line is connected to the connection terminal 451, whereby the fan drive control component 45 is electrically connected to and capable of communicating with a device (here, the adapter unit 50) connected to the other end side of the communication line.

When a control signal (a later-described rotational speed control signal) is sent to the fan drive control component 45 from the adapter unit 50 connected thereto via the connection terminal 451 and the communication line (i.e., when a control signal is input to the fan drive control component 45 via the connection terminal 451), the fan drive control component 45 supplies a drive voltage to the supply air fan motor 43*a* or the exhaust air fan motor 44*a* so as to drive the supply air fan motor 43*a* or the exhaust air fan motor 44*a* at a rotational speed based on that rotational speed control signal.

(1-3) Adapter Units 50

The adapter units 50 are units that control the running of the corresponding ventilation units 40 (the supply air fan 43 and the exhaust air fan 44) by sending a control signal to the fan drive control component 45. The air conditioning system 100 has plural (here, two) adapter units 50 (a first adapter unit 50*a* and a second adapter unit 50*b*). Specifically, the first adapter unit 50*a* is disposed in the target space SP1 and corresponds to the ventilation unit 40*a*. The second adapter unit 50*b* is disposed in the target space SP2 and corresponds to the ventilation unit 40*b*.

The adapter units 50 are configured separately from, and are disposed independently of, the corresponding ventilation units 40 (the body frame 41). In particular, in the present embodiment, the adapter units 50 are additionally disposed in the target spaces SP in which the air conditioner 10 and the ventilation units 40 are already installed.

Each adapter unit 50 includes a microcomputer configured by memories, such as a RAM and a ROM, a CPU and the like. Furthermore, each adapter unit 50 includes a communication module for sending signals to and receiving signals from the fan drive control component 45 and the indoor unit control component 34.

The adapter unit 50 sends, to the fan drive control component 45 on the basis of a signal sent from the indoor unit control component 34 (the controller 70), a signal (hereinafter called a "rotational speed control signal") including commands to power on/off and switch the rotational speed of the supply air fan 43 (the supply air fan motor 43*a*) and/or the exhaust air fan 44 (the exhaust air fan motor 44*a*). That is, the adapter unit 50 controls the running of the ventilation unit 40 on the basis of electrical signals it receives.

When the adapter unit 50 is powered on, the adapter unit 50 periodically (each time a predetermined amount of time t1 elapses) performs a determination (hereafter called a "status determination") as to whether or not communication with the fan drive control component 45 is normally possible and the ventilation unit 40 will run mechanically normally. In the present embodiment, the predetermined amount of time t1 is set to 1 minute.

When the adapter unit 50 confirms that the determination result in the status determination is normal (i.e., the communication between the adapter unit 50 and the ventilation unit 40 is normally possible and the ventilation unit 40 will run mechanically normally), the adapter unit 50 sends a transmission signal (hereinafter called a "status notification signal") to the indoor unit control component 34. That is, the adapter unit 50 periodically sends the status notification signal (notification signal) to the indoor unit control component 34 (the controller 70) in a state in which the communication with the fan drive control component 45 is normally possible and the ventilation unit 40 will run mechanically normally.

Specifically, in the status determination, the adapter unit 50 determines that the communication with the ventilation unit 40 is normally possible and the ventilation unit 40 will run mechanically normally in a case where the running of the ventilation unit 40 with respect to a drive command or a rotational speed control signal is normal (specifically, a case where the ventilation unit 40 in a stopped state is driven normally upon receiving a drive command or a case where the rotational speed of the supply air fan 43 or the exhaust air fan 44 being driven matches the most recent rotational speed control signal that was sent). On the other hand, the adapter unit 50 determines that the communication with the ventilation unit 40 cannot be performed normally or the ventilation unit 40 will not run mechanically normally in a case where the running of the ventilation unit 40 with respect to a drive command or a rotational speed control signal is not normal (specifically, a case where the ventilation unit 40 in a stopped state is not driven normally upon receiving a drive command or a case where the rotational speed of the supply air fan 43 or the exhaust air fan 44 being driven does not match the most recent rotational speed control signal that was sent).

It should be noted that the adapter unit 50 detects the power on/off status and the rotational speed of the supply air fan 43 and the exhaust air fan 44 by means of a known method on the basis, for example, of a change in the magnetic flux or the motor current flowing in the supply air fan motor 43*a* or the exhaust air fan motor 44*a*.

Here, the status notification signal is a signal for notifying the indoor unit control component 34 (the controller 70) that the communication between the adapter unit 50 and the fan drive control component 45 (the ventilation unit 40) and the communication between the adapter unit 50 and the indoor unit control component 34 (the controller 70) can be performed normally and the ventilation unit 40 will run mechanically normally. That is, the adapter unit 50 periodically (each time the predetermined amount of time t1 elapses) sends the status notification signal to the indoor unit control component 34 (the controller 70) in a case where the running of the ventilation unit 40 is controllable.

Details of the adapter units 50 will be described in a later section "(3) Details of Adapter Units 50".

(1-4) Refrigerant Leak Sensors 60

The refrigerant leak sensors 60 are sensors for detecting refrigerant leakage in the target spaces SP. In the present embodiment, known general-purpose sensors are used for the refrigerant leak sensors 60.

The refrigerant leak sensors 60 are disposed in the corresponding target spaces SP. The air conditioning system 100 has plural (two) refrigerant leak sensors 60 (a first refrigerant leak sensor 60*a* and a second refrigerant leak sensor 60*b*).

The first refrigerant leak sensor 60*a* is installed in the target space SP1. The second refrigerant leak sensor 60*b* is installed in the target space SP2.

The refrigerant leak sensors 60 are electrically connected to the indoor unit control component 34 of the indoor unit 30 installed in the same target space SP. The first refrigerant leak sensor 60*a* is electrically connected to the indoor unit control component 34 of the indoor unit 30*b*. The second refrigerant leak sensor 60*b* is electrically connected to the indoor unit control component 34 of the indoor unit 30*d*.

When the refrigerant leak sensors 60 detect refrigerant leakage, the refrigerant leak sensors 60 output, to the indoor unit control components 34 to which they are connected, an electrical signal (hereinafter called a "refrigerant leak signal") indicating that refrigerant leakage is occurring.

(1-5) Controller 70

In the air conditioning system 100, the controller 70 that controls the running of the air conditioning system 100 is configured as a result of the outdoor unit control component 26, the indoor unit control components 34, the remote controllers 35, and the central management device 38 being interconnected via the communication network. Details of the controller 70 will be described in a later section "(4) Details of controller 70".

(2) Operations of Air Conditioning System 100

(2-1) Cooling Operation

When control pertaining to the cooling operation is executed by the controller 70 as a result, for example, of an instruction to start the cooling operation being input to the remote controller 35, the four-way switching valve 22 is switched to a cooling operation state (the state indicated by the solid lines of the four-way switching valve 22 in FIG. 2) and the compressor 21 and the outdoor fan 25 start up. Furthermore, the indoor fans 33 of the indoor units 30 (hereinafter called "the cooling indoor units 30") installed in the target spaces SP where the cooling operation is to be performed start up, and the indoor expansion valves 32 are opened at an appropriate opening degree.

In this state, the refrigerant flowing into the indoor heat exchangers 31 of the cooling indoor units 30 exchanges heat with the flows of air generated by the indoor fans 33 and evaporates. The refrigerant flowing out of the indoor heat exchangers 31 travels through the gas intercommunication pipe GP, the first pipe P1, the four-way switching valve 22, and the second pipe P2, and is sucked into the compressor 21 and compressed. The refrigerant discharged from the compressor 21 travels through the third pipe P3, the four-way switching valve 22, and the fourth pipe P4 and flows into the outdoor heat exchanger 23.

The refrigerant flowing into the outdoor heat exchanger 23 exchanges heat with the flow of air generated by the outdoor fan 25 and condenses. The refrigerant flowing out from the outdoor heat exchanger 23 travels through the fifth pipe P5, the outdoor expansion valve 24, the sixth pipe P6, and the liquid intercommunication pipe LP, and flows into the indoor expansion valves 32 of the cooling indoor units 30. The refrigerant flowing into the indoor expansion valves 32 has its pressure reduced in accordance with the opening degree of the indoor expansion valves 32. The refrigerant flowing out from the indoor expansion valves 32 flows back into the indoor heat exchangers 31.

(2-2) Heating Operation

When control pertaining to the heating operation is executed by the controller 70 as a result, for example, of an instruction to start the heating operation being input to the remote controller 35, the four-way switching valve 22 is switched to a heating operation state (the state indicated by the dashed lines of the four-way switching valve 22 in FIG. 2) and the compressor 21 and the outdoor fan 25 start up. Furthermore, the outdoor expansion valve 24 is opened at an appropriate opening degree. Furthermore, the indoor fans 33 of the indoor units 30 (hereinafter called "the heating indoor units 30") installed in the target spaces SP where the heating operation is to be performed start up.

In this state, the refrigerant flowing into the outdoor heat exchanger 23 exchanges heat with the flow of air generated by the outdoor fan 25 and evaporates. The refrigerant flowing out of the outdoor heat exchanger 23 travels through the fourth pipe P4, the four-way switching valve 22, and the second pipe P2, and is sucked into the compressor 21 and compressed. The refrigerant discharged from the compressor 21 travels through the third pipe P3, the four-way switching valve 22, the first pipe P1, and the gas intercommunication pipe GP, and flows into the indoor heat exchangers 31 of the heating indoor units 30.

The refrigerant flowing into the indoor heat exchangers 31 exchanges heat with the flows of air generated by the indoor fans 33 and condenses. The refrigerant flowing out from the indoor heat exchangers 31 travels through the indoor expansion valve 32, the liquid intercommunication pipe LP, and the sixth pipe P6, and flows into the outdoor expansion valve 24. The refrigerant flowing into the outdoor expansion valve 24 has its pressure reduced in accordance with the opening degree of the outdoor expansion valve 24. The refrigerant flowing out from the outdoor expansion valve 24 flows back into the outdoor heat exchanger 23.

(2-3) Ventilation Operation

When an instruction to start the ventilation operation is issued to the ventilation unit 40, the supply air fan 43 and the exhaust air fan 44 start up. It should be noted that there are cases where the ventilation operation instruction is issued by a request from the adapter unit 50 and cases where the ventilation operation instruction is issued by a request from the controller 70.

When the supply air fan 43 and the exhaust air fan 44 become driven, the outdoor air OA flowing through the intake duct 401 from the outside into the ventilation unit 40 and the room air RA flowing through the removal duct 403 from the target spaces SP into the ventilation unit 40 exchange heat in the heat exchanger 42. Thereafter, the outdoor air OA that has exchanged heat in the heat exchanger 42 is supplied through the supply air duct 402 as supply air SA to the target spaces SP. Furthermore, the room air RA that has exchanged heat in the heat exchanger 42 is exhausted through the exhaust air duct 404 as exhaust air EA to the outside.

(2-4) Forced Ventilation Operation

In the air conditioning system 100, in a case where the refrigerant has leaked in the target spaces SP, a forced ventilation operation is performed to discharge the leaked refrigerant to the outside.

Specifically, when the refrigerant leaks from the refrigerant circuit RC and the leaked refrigerant flows into the target spaces SP, the refrigerant leakage is detected by the refrigerant leak sensor 60. The controller 70 receives a signal from the refrigerant leak sensor 60, detects that refrigerant leakage is occurring, and sends a signal to start the forced ventilation operation to the corresponding adapter unit 50 so as to start up the ventilation unit 40 installed in the target spaces SP in which the refrigerant leak sensor 60 has detected the refrigerant leakage. Because of this, the supply air fan 43 and the exhaust air fan 44 start up. In the forced ventilation operation, the supply air fan 43 and the exhaust air fan 44 continue to be driven in a state in which their rotational speed (air volume) is a maximum, for example.

It should be noted that, at this time, the controller 70 controls the indoor expansion valves 32 of the indoor units 30 to a minimum opening degree (a completely closed state), stops the indoor fans 33, and stops the compressor 21 and the outdoor fan 25. Because of this, the circulation of the refrigerant in the refrigerant circuit RC stops, so that further leakage of the refrigerant is suppressed.

Furthermore, the controller 70, so as to notify the user that refrigerant leakage is occurring, has the remote controller 35 display information indicating that refrigerant leakage is occurring and information identifying the target space SP in which the refrigerant leakage is occurring.

(3) Details of Adapter Units 50

Figure 4:
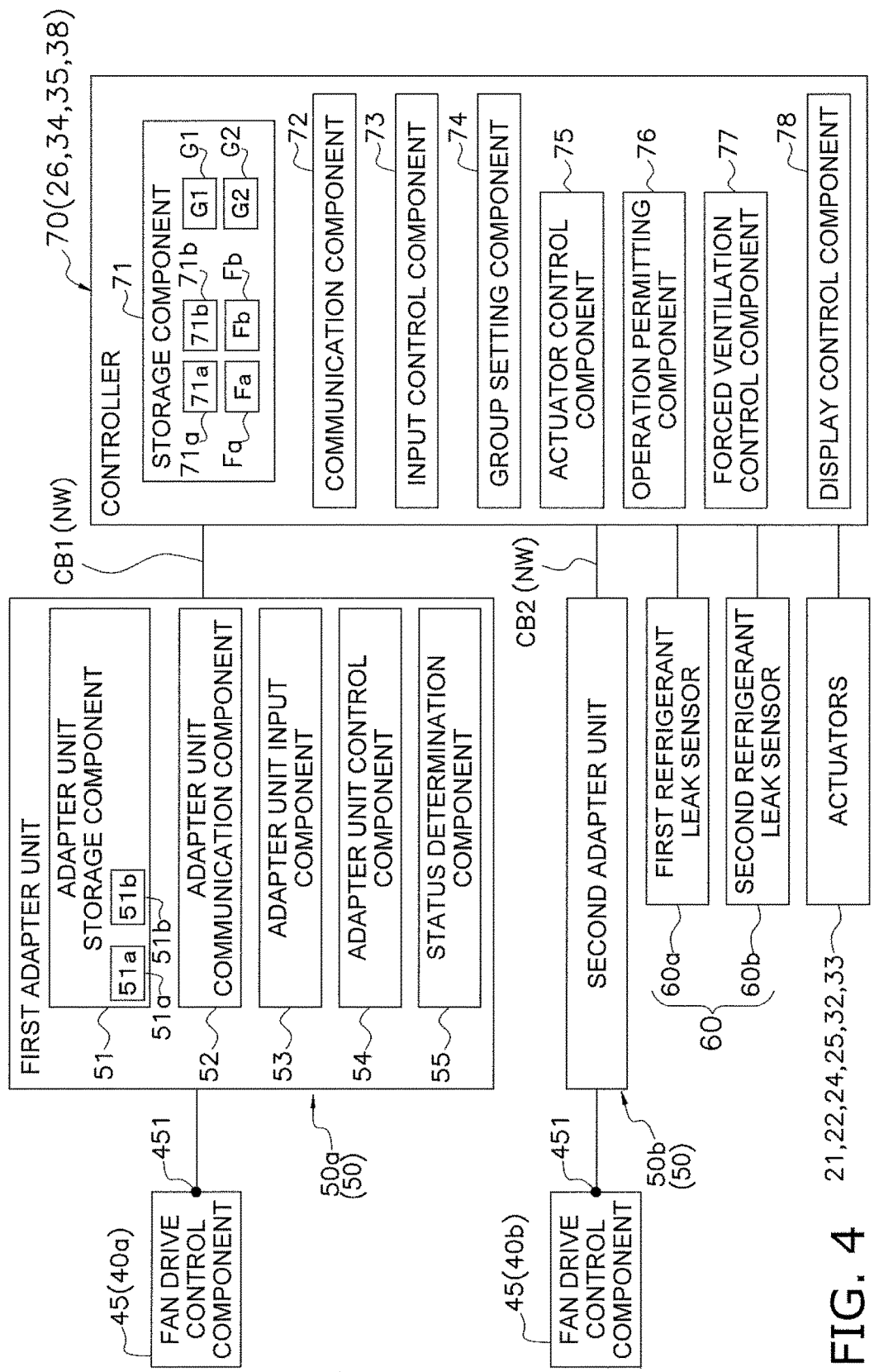
FIG. 4 is a block diagram schematically showing a controller and parts connected to the controller.

FIG. 4 is a block diagram schematically showing the controller 70 and parts connected to the controller 70.

Each adapter unit 50 mainly has an adapter unit storage component 51, an adapter unit communication component 52, an adapter unit input component 53, an adapter unit control component 54, and a status determination component 55.

(3-1) Adapter Unit Storage Component 51

The adapter unit storage component 51 is configured by a ROM, a RAM, a flash memory and the like. The adapter unit storage component 51 includes volatile and nonvolatile storage regions for storing various types of information. Programs used in processing by the components in the adapter unit 50 are stored in the adapter unit storage component 51.

Furthermore, the adapter unit storage component 51 includes an operation command discrimination flag 51a that discriminates whether or not an instruction to start operating has been input from the user or the controller 70. The operation command discrimination flag 51a is raised in a case where an instruction to start operating has been input to the ventilation unit 40 and is cancelled in a case where the ventilation unit 40 is to be stopped.

Furthermore, the adapter unit storage component 51 includes an air volume discrimination flag 51b that discriminates the rotational speed (air volume) that has been input from the user or the controller 70. The air volume discrimination flag 51b includes a predetermined number of bits so as to be able to discriminate, in stages, the rotational speeds (air volumes) of the supply air fan 43 and the exhaust air fan 44.

(3-2) Adapter Unit Communication Component 52

The adapter unit communication component 52 receives, and stores in a predetermined storage region of the adapter unit storage component 51, signals sent from the controller 70 and the fan drive control component 45.

Furthermore, when the adapter unit communication component 52 receives a signal to start operating or a signal to start the forced ventilation operation sent from the controller 70, the adapter unit communication component 52 raises the operation command discrimination flag 51a.

Furthermore, when the adapter unit communication component 52 receives a signal instructing a rotational speed sent from the controller 70 or the like, the adapter unit communication component 52 sets the air volume discrimination flag 51b so as to correspond to that rotational speed.

Furthermore, when the adapter unit communication component 52 receives a signal to start the forced ventilation operation sent from the controller 70, the adapter unit communication component 52 sets the air volume discrimination flag 51b so as to correspond to the maximum rotational speed (maximum air volume) of the supply air fan 43 and the exhaust air fan 44.

The adapter unit communication component 52 sends predetermined signals upon receiving requests from other parts. For example, the adapter unit communication component 52 sends a rotational speed control signal to the fan drive control component 45 upon receiving a request from the adapter unit control component 54.

(3-3) Adapter Unit Input Component 53

The adapter unit input component 53 is a part that receives commands input by the user via input keys (not shown in the drawings) and the like. When the adapter unit input component 53 receives an instruction to start operating that has been input by the user, the adapter unit input component 53 raises the operation command discrimination flag 51a. Furthermore, when the adapter unit input component 53 receives a rotational speed (air volume) designation instruction that has been input by the user, the adapter unit input component 53 sets the air volume discrimination flag 51b so as to correspond to the designated rotational speed (air volume).

(3-4) Adapter Unit Control Component 54

The adapter unit control component 54 sends predetermined signals to the fan drive control component 45 to power on/off and adjust the air volume of the supply air fan 43 and the exhaust air fan 44.

When the operation command discrimination flag 51a is raised, the adapter unit control component 54 references the air volume discrimination flag 51b and sends a rotational speed control signal to the fan drive control component 45. Because of this, the supply air fan 43 and the exhaust air fan 44 are driven at the designated rotational speed (air volume).

Furthermore, when the operation command discrimination flag 51a is cancelled, the adapter unit control component 54 sends a signal to stop operating to the fan drive control component 45. Because of this, the supply air fan 43 and the exhaust air fan 44 stop.

(3-5) Status Determination Component 55

Figure 5:
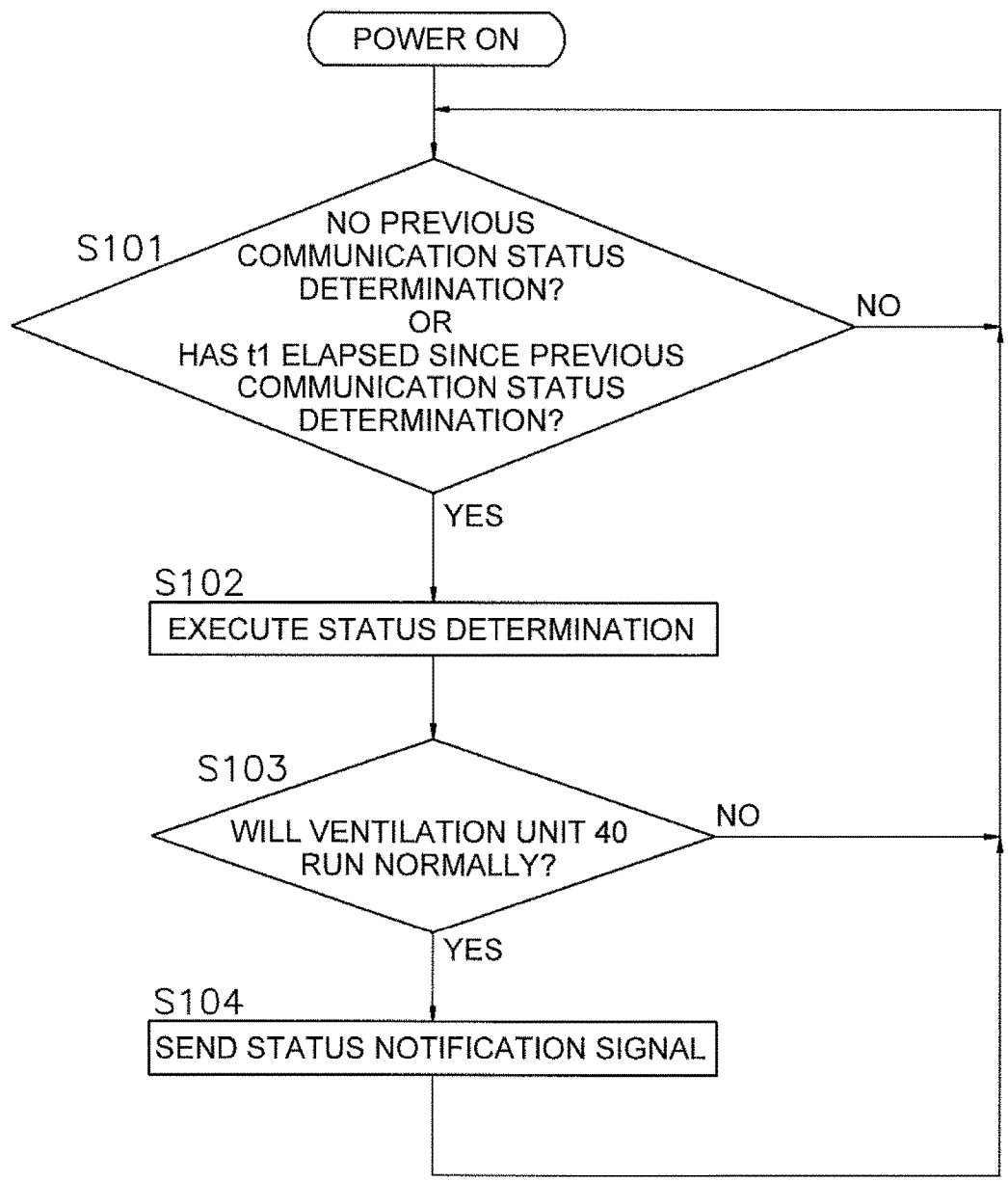
FIG. 5 is a flowchart showing an example of a flow of processing performed by a status determination component (an adapter unit).

FIG. 5 is a flowchart showing an example of a flow of processing performed by the status determination component 55.

The status determination component 55 is a functional component that determines whether or not the running of the ventilation unit 40 is normally controllable. The status determination component 55 has a timer function and can measure time.

When the status determination component 55 is powered on, the status determination component 55 performs, with respect to the fan drive control component 45, the status determination each time the predetermined amount of time t1 (10 seconds) elapses (see step S101 and step S102 in FIG. 5).

In a case where, as a result of the status determination, the status determination component 55 has determined that communication with the ventilation unit 40 is normally possible and the ventilation unit 40 will run mechanically normally (i.e., that the ventilation unit 40 will run normally), the status determination component 55 generates a status notification signal and has the adapter unit communication component 52 send the status notification signal to the controller 70 (see steps S103 and S104 in FIG. 5). At this time, the status determination component 55 generates the status notification signal including information relating to the rotational speeds (air volumes) of the supply air fan 43 and the exhaust air fan 44 that have been detected.

(4) Details of Controller 70

As shown in FIG. 4, the controller 70 is electrically connected to each adapter unit 50 (the first adapter unit 50a and the second adapter unit 50*b*). Furthermore, the controller 70 is electrically connected to each refrigerant leak sensor 60 (the first refrigerant leak sensor 60*a* and the second refrigerant leak sensor 60*b*). Furthermore, the controller 70 is electrically connected to each actuator of the air conditioner 10 (the compressor 21, the four-way switching valve 22, the outdoor expansion valve 24, the outdoor fan 25, the indoor expansion valves 32, and the indoor fans 33, etc.).

The controller 70 mainly has a storage component 71, a communication component 72, an input control component 73, a group setting component 74, an actuator control component 75, an operation permitting component 76, a forced ventilation control component 77, and a display control component 78.

(4-1) Storage Component 71

The storage component 71 is configured by a ROM, a RAM, a flash memory and the like. The storage component 71 includes volatile and nonvolatile storage regions for storing various types of information. Programs used in processing by the components in the controller 70 are stored in the storage component 71.

Command information, which is information identifying setting items such as an instruction to start operating, an instruction to stop operating, an operating mode designation, a set temperature designation, an air volume designation, and an air direction designation input by the user, is appropriately stored in the storage component 71.

Furthermore, a grouping table TB1 (described later) used in group control (described later) is stored in the storage component 71.

Furthermore, the storage component 71 includes status discrimination flags 71*a* and 71*b* for discriminating, for each ventilation unit 40, whether or not communication with the ventilation unit 40 is normally possible and the ventilation unit 40 will run mechanically normally (i.e., whether or not the ventilation unit 40 is normally controllable). The status discrimination flags 71*a* and 71*b* correspond in a one-to-one ratio to either of the adapter units 50 (i.e., either of the ventilation units 40).

Specifically, the status discrimination flag 71*a* corresponds to the first adapter unit 50*a* (i.e., the ventilation unit 40*a*) and is a flag for discriminating whether or not communication with the ventilation unit 40*a* is normally possible and the ventilation unit 40*a* will run mechanically normally. The status discrimination flag 71*b* corresponds to the second adapter unit 50*b* (i.e., the ventilation unit 40*b*) and is a flag for discriminating whether or not communication with the ventilation unit 40*b* is normally possible and the ventilation unit 40*b* will run mechanically normally.

The status discrimination flags 71*a* and 71*b* are raised when the controller 70 receives a status notification signal and are cancelled in a case where the controller 70 does not receive a new status notification signal in a predetermined amount of time t2 or longer since receiving a previous status notification signal. That is, in a case where the controller 70 does not receive a status notification signal from the adapter units 50 or in a case where the controller 70 does not receive a new status notification signal in the predetermined amount of time t2 or longer since a previous status notification signal, the controller 70 judges that communication between the adapter units 50 and the ventilation units 40 or communication between the controller 70 and the adapter units 50 cannot be performed normally or that the ventilation units 40 will not run mechanically normally and does not raise or cancels the status discrimination flags. It should be noted that, in the present embodiment, the predetermined amount of time t2 is set to 3 minutes.

Furthermore, the storage component 71 includes refrigerant leak discrimination flags Fa and Fb for individually discriminating the detection results of the refrigerant leak sensors 60 (i.e., whether or not there is refrigerant leakage in the target spaces SP). The refrigerant leak discrimination flags Fa and Fb correspond in a one-to-one ratio to either of the refrigerant leak sensors 60. Specifically, the refrigerant leak discrimination flag Fa corresponds to the first refrigerant leak sensor 60*a*. The refrigerant leak discrimination flag Fb corresponds to the second refrigerant leak sensor 60*b*. The refrigerant leak discrimination flags Fa and Fb are raised in a case where the controller 70 has received a refrigerant leak signal from the corresponding refrigerant leak sensor 60 (i.e., in a case where refrigerant leakage has occurred in the target spaces SP in which the corresponding refrigerant leak sensor 60 is installed).

Furthermore, in the storage component 71, operation permitted/prohibited discrimination flags (G1 and G2) that identify, for each later-described group, whether or not operation of the indoor units 30 is permitted by the operation permitting component 76 are provided in correspondence to the number of groups (here, two).

The operation permitted/prohibited discrimination flag G1 corresponds to group 1 (described later), and the operation permitted/prohibited discrimination flag G2 corresponds to group 2 (described later). When the operation permitted/prohibited discrimination flag G1 is not raised, this means that operation of the indoor units 30 (30*a* and 30*b*) belonging to group 1 is prohibited, and when the operation permitted/prohibited discrimination flag G1 is raised, this means that operation of those indoor units 30 is permitted. Furthermore, when the operation permitted/prohibited discrimination flag G2 is not raised, this means that operation of the indoor units 30 (30*c* and 30*d*) belonging to group 2 is prohibited, and when the operation permitted/prohibited discrimination flag G2 is raised, this means that operation of those indoor units 30 is permitted.

(4-2) Communication Component 72

The communication component 72 receives, and stores in a predetermined storage region of the storage component 71, signals sent from other parts (the adapter units 50, the remote controllers 35, or the actuators and sensors). Furthermore, when the communication component 72 receives a status notification signal from a fan drive control component 45, the communication component 72 raises the status discrimination flag (71*a* or 71*b*) corresponding to the adapter unit 50 that was the source of the transmission. Furthermore, in a case where the communication component 72 receives a refrigerant leak signal from the refrigerant leak sensor 60, the communication component 72 raises the corresponding refrigerant leak discrimination flag (Fa or Fb).

(4-3) Input Control Component 73

The input control component 73 receives user commands, executes processing corresponding to the commands, and stores the processing results in a predetermined storage region of the storage component 71.

For example, when a setting item such as an instruction to start operating, an instruction to stop operating, an operating mode designation, a set temperature designation, a set air volume designation, or an air direction designation has been newly input by the user, the input control component 73 stores in the storage component 71 command information identifying the instruction that was input.

(4-4) Group Setting Component 74

Furthermore, when a grouping setting has been performed by the user, the group setting component 74 creates, and stores in the storage component 71, a table (hereinafter called a "grouping table TB1") based on that grouping setting.

It should be noted that the "grouping setting" is processing that divides into groups and registers the devices included in the air conditioning system 100 (specifically, the indoor units 30, the ventilation units 40, and the refrigerant leak sensors 60). The grouping setting is performed in order to execute group control that generally controls the operating status by group.

FIG. 6 is a schematic diagram showing an example of the grouping table TB1. In FIG. 6, the variable "unit number", which is unique identification information, the variable "group number", which is information identifying the group to which the corresponding device belongs, and the variable "device type", which is information identifying the device type, are individually defined for each device.

For example, the value of the unit number of the indoor unit 30a is defined as "1". Furthermore, regarding the values of the unit numbers of the other devices, the indoor unit 30b is defined as "2", the indoor unit 30c is defined as "3", the indoor unit 30d is defined as "4", the ventilation unit 40a is defined as "5", the ventilation unit 40b is defined as "6", the first refrigerant leak sensor 60a is defined as "7", and the second refrigerant leak sensor 60b is defined as "8".

Furthermore, the value of the group number of the indoor unit 30a is defined as "1". Furthermore, regarding the values of the group numbers of the other devices, the indoor unit 30b is defined as "1", the indoor unit 30c is defined as "2", the indoor unit 30d is defined as "2", the ventilation unit 40a is defined as "1", the ventilation unit 40b is defined as "2", the first refrigerant leak sensor 60a is defined as "1", and the second refrigerant leak sensor 60b is defined as "2". That is, in the grouping table TB1 shown in FIG. 6, the indoor unit 30a, the indoor unit 30b, the ventilation unit 40a, and the first refrigerant leak sensor 60a installed in the target space SP1 are shown as belonging to the same group (group 1). Furthermore, the indoor unit 30c, the indoor unit 30d, the ventilation unit 40b, and the second refrigerant leak sensor 60b installed in the target space SP2 are shown as belonging to the same group (group 2).

Furthermore, the value of the device type of the indoor unit 30a, the indoor unit 30b, the indoor unit 30c, and the indoor unit 30d is defined as "1" which indicates they are indoor units. Furthermore, the value of the device type of the ventilation units 40a and 40b is defined as "2" which indicates they are ventilation units 40. Furthermore, the value of the device type of the first refrigerant leak sensor 60a and the second refrigerant leak sensor 60b is defined as "3" which indicates they are refrigerant leak sensors 60.

The input control component 73 appropriately updates the grouping table TB1 when a grouping setting has been newly performed by the user. Because of this, in the air conditioning system 100, it is possible to generally control the running of the plural indoor units 30 and ventilation units 40 and operate in conjunction with each other (i.e., group control), the indoor units 30 and the ventilation units 40 installed in the same target spaces SP.

It should be noted that, in the present embodiment, the indoor unit 30a is set as the master device of group 1 and the indoor unit 30c is set as the master device of group 2.

(4-5) Actuator Control Component 75

The actuator control component 75 individually controls, in accordance with the situation, the running of the actuators (e.g., the compressor 21, the four-way switching valve 22, the outdoor expansion valve 24, the outdoor fan 25, the indoor expansion valves 32, and the indoor fans 33, etc.) included in the air conditioner 10 following a control program.

Furthermore, in a case where group control is requested, the actuator control component 75 executes group control that generally controls, by group, the operating status of the devices included in the air conditioning system 100 on the basis of the grouping table TB1 stored in the storage component 71. The "case where group control is requested" is, for example, a case where a command to switch the operating status by group is input by the user.

The actuator control component 75 appropriately references the refrigerant leak discrimination flags Fa and Fb and, when the refrigerant leak discrimination flag Fa or Fb is raised, drives the indoor fans 33 at the maximum rotational speed and controls to a shutdown state the other actuators included in the air conditioner 10. Specifically, the actuator control component 75 controls to the minimum opening degree (completely closed) the indoor expansion valves 32 and stops the driving of the compressor 21 and the outdoor fan 25.

It should be noted that the reason the actuator control component 75 drives the indoor fans 33 at the maximum rotational speed when refrigerant leakage has occurred in this way is to agitate the refrigerant that has leaked in the target space SP and keep the refrigerant concentration from rising. Furthermore, the reason the actuator control component 75 controls the indoor expansion valves 32 to the minimum opening degree (completely closed) and stops the driving of the compressor 21 and the outdoor fan 25 is to stop further circulation of the refrigerant in the refrigerant circuit RC and control further leakage of the refrigerant.

Furthermore, the actuator control component 75 appropriately references the operation permitted/prohibited discrimination flags G1 and G2 and, when the operation permitted/prohibited discrimination flag G1 or G2 is not raised, controls to a shutdown state the indoor units 30 belonging to the corresponding group. For example, when the operation permitted/prohibited discrimination flag G1 is not raised, the actuator control component 75 controls to a shutdown state the indoor units 30a and 30b belonging to group 1. Furthermore, when the operation permitted/prohibited discrimination flag G2 is not raised, the actuator control component 75 controls to a shutdown state the indoor units 30c and 30d belonging to group 2.

It should be noted that the "shutdown state" of the indoor units 30 is a state in which the indoor expansion valves 32 are controlled to the minimum opening degree (completely closed) and the driving of the indoor fans 33 is stopped. Furthermore, "controls to a shutdown state" of the indoor units 30 includes not allowing the indoor units 30 to start operating even if a signal to start operating is input in a case where the indoor units 30 are stopped, and stopping operation of the indoor units 30 even if a signal to stop operating is not input in a case where the indoor units 30 are operating.

(4-6) Operation Permitting Component 76

The operation permitting component 76 is a functional component that decides whether or not to permit operation of the indoor units 30 by group. The operation permitting component 76 references the status discrimination flags 71a and 71b in the storage component 71, decides whether or not to permit operation of the indoor units 30 on the basis of the status of the status discrimination flags 71a and 71b, and raises the operation permitted/prohibited discrimination flag G1 or G2 in accordance with the situation.

For example, in case where the status discrimination flag 71a is not raised, the operation permitting component 76 does not raise or cancels the operation permitted/prohibited discrimination flag G1 to prohibit operation of the indoor units 30a and 30b belonging to group 1. Furthermore, in a case where the status discrimination flag 71b is not raised, the operation permitting component 76 does not raise or cancels the operation permitted/prohibited discrimination flag G2 to prohibit operation of the indoor units 30c and 30d belonging to group 2.

(4-7) Forced Ventilation Control Component 77

The forced ventilation control component 77 is a functional component which, when refrigerant leakage has occurred in a target space SP, forcibly drives the ventilation unit 40 installed in that target space SP.

The forced ventilation control component 77 appropriately references the refrigerant leak discrimination flags Fa and Fb and, when the refrigerant leak discrimination flag Fa or Fb is raised, sends a forced ventilation signal to the corresponding adapter unit 50.

Specifically, in the processing performed by the forced ventilation control component 77, the refrigerant leak discrimination flag Fa and the first adapter unit 50a are correlated with each other, and when the refrigerant leak discrimination flag Fa is raised, the forced ventilation control component 77 sends a forced ventilation signal to the first adapter unit 50a. As a result, when refrigerant leakage has occurred in the target space SP1, the supply air fan 43 and the exhaust air fan 44 of the ventilation unit 40a are driven at the maximum rotational speed (maximum air volume) (i.e., the forced ventilation operation is performed).

Furthermore, in the processing performed by the forced ventilation control component 77, the refrigerant leak discrimination flag Fb and the second adapter unit 50b are correlated with each other, and when the refrigerant leak discrimination flag Fb is raised, the forced ventilation control component 77 sends a forced ventilation signal to the second adapter unit 50b. As a result, when refrigerant leakage has occurred in the target space SP2, the supply air fan 43 and the exhaust air fan 44 of the ventilation unit 40b are driven at the maximum rotational speed (maximum air volume) (i.e., the forced ventilation operation is performed).

(4-8) Display Control Component 78

The display control component 78, in accordance with the situation, generates display information to be displayed to the user and has the corresponding device (the remote controllers 35 or the central management device 38) display the display information.

For example, in a case where the air conditioner 10 is operating, the display control component 78 generates, and has the corresponding remote controller 35 display, display information displaying operating information (the set temperature, the set air volume, or the air direction, etc.) about the indoor units 30 being driven.

Furthermore, the display control component 78 appropriately references the operation permitted/prohibited discrimination flags G1 and G2 and generates display information corresponding to the status of the operation permitted/prohibited discrimination flags G1 and G2. For example, when the operation permitted/prohibited discrimination flag G1 is not raised, the display control component 78 generates, and has the remote controller 35a and the central management device 38 display, display information indicating that operation of the indoor units 30 in group 1 is prohibited. Furthermore, when the operation permitted/prohibited discrimination flag G2 is not raised, the display control component 78 generates, and has the remote controller 35b display, display information indicating that operation of the indoor units 30 in group 2 is prohibited.

Furthermore, the display control component 78 appropriately references the status discrimination flags 71a and 71b and generates display information corresponding to the status of the status discrimination flags 71a and 71b. For example, when the status discrimination flag 71a is not raised, the display control component 78 generates, and has the remote controller 35a and the central management device 38 display, display information indicating that the ventilation unit 40a in group 1 (the target space SP1) cannot be controlled normally (i.e., communication with the ventilation unit 40a cannot be performed normally or the ventilation unit 40a will not run normally). Furthermore, when the status discrimination flag 71b is not raised, the display control component 78 generates, and has the remote controller 35b and the central management device 38 display, display information indicating that the ventilation unit 40b in group 2 (the target space SP2) cannot be controlled normally (i.e., communication with the ventilation unit 40b cannot be performed normally or the ventilation unit 40b will not run normally).

Furthermore, the display control component 78 appropriately references the refrigerant leak discrimination flags Fa and Fb and generates display information corresponding to the status of the refrigerant leak discrimination flag Fa or Fb. For example, when the refrigerant leak discrimination flag Fa has been raised, the display control component 78 generates, and has the remote controller 35a and the central management device 38 display, display information indicating that refrigerant leakage is occurring in the target space SP1. Furthermore, when the refrigerant leak discrimination flag Fb has been raised, the display control component 78 generates, and has the remote controller 35b and the central management device 38 display, display information indicating that refrigerant leakage is occurring in the target space SP2.

(5) Flow of Processing Performed by Controller 70

Figure 7:
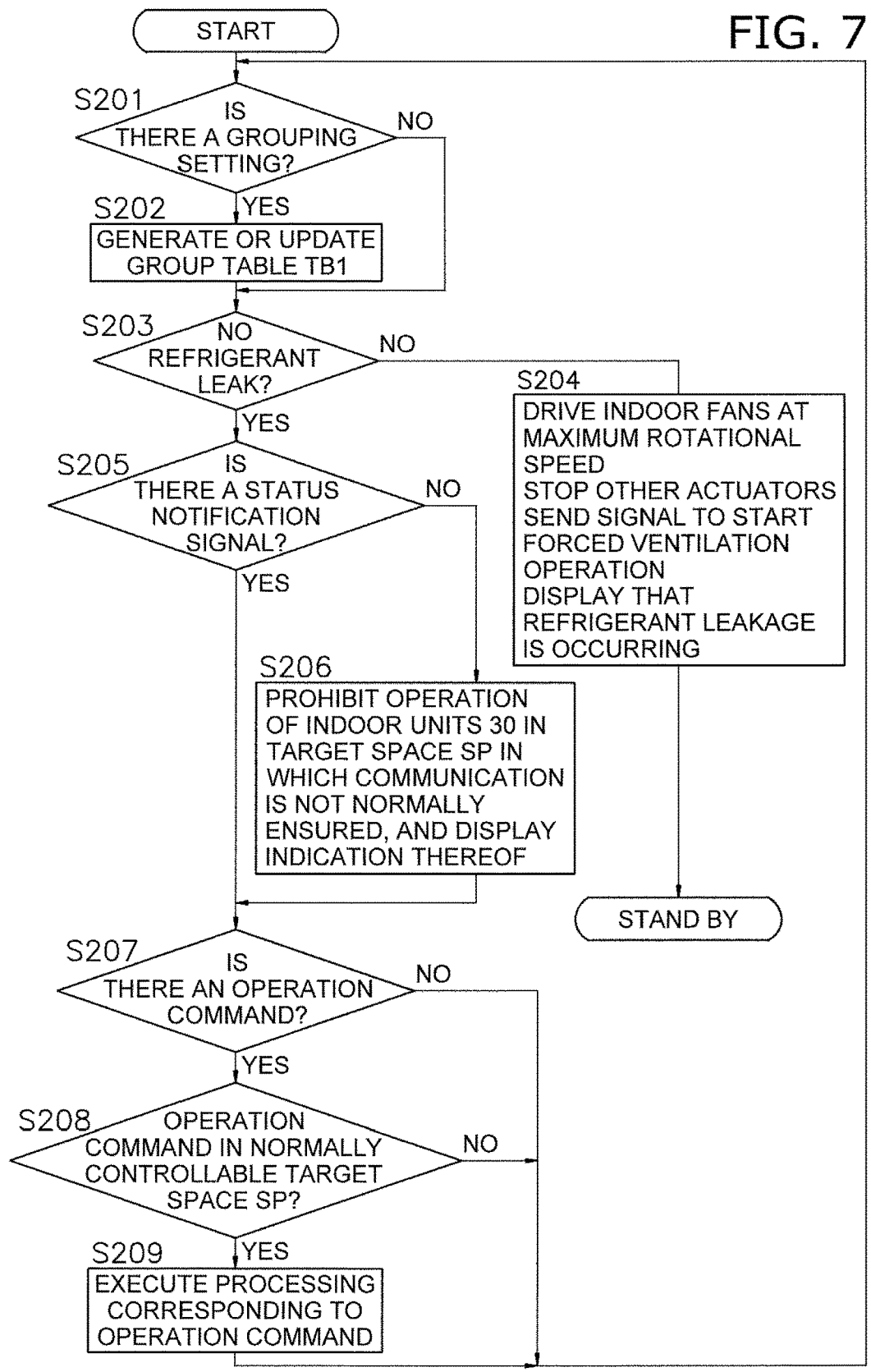
FIG. 7 is a flowchart showing an example of a flow of processing performed by the controller.

FIG. 7 is flowchart showing an example of a flow of processing performed by the controller 70.

The controller 70 executes control by the following flow, for example. It should be noted that the following flow of processing is an example and can be appropriately changed.

In step S201 the controller 70 determines whether or not a grouping setting has been input by the user. In a case where the determination is NO (i.e., in a case where a grouping setting has not been input by the user), the controller 70 advances to step S203. On the other hand, in a case where the determination is YES (i.e., in a case where a grouping setting has been input by the user), the controller 70 advances to step S202.

In step S202 the controller 70 generates or (updates) the grouping table TB1 on the basis of the grouping setting of the user that was input. Thereafter the controller 70 advances to step S203.

In step S203 the controller 70 determines whether or not there is no refrigerant leakage occurring. In a case where the determination is NO (i.e., in a case where refrigerant leakage is occurring), the controller 70 advances to step S204. On the other hand, in a case where the determination is YES (i.e., in a case where refrigerant leakage is not occurring), the controller 70 advances to step S205.

In step S204 the controller 70 causes the indoor fans 33 of the indoor units 30 in the target space SP in which the refrigerant leakage has occurred to operate at the maximum rotational speed (maximum air volume). Furthermore, the controller 70 controls to a stopped state the other actuators of the air conditioning system 10. Furthermore, the controller 70 sends to the corresponding adapter unit 50 a signal to start the forced ventilation operation to cause the ventilation unit 40 installed in the target space SP in which the refrigerant leakage is occurring to operate at the maximum rotational speed (maximum air volume). Furthermore, the controller 70 has the remote controller 35 and the central management device 38 display an indication that refrigerant leakage is occurring. Thereafter, the controller 70 continues this state until it is cancelled by the user.

In step S205 the controller 70 determines whether or not it is normally receiving the status notification signal. In a case where the determination is NO (i.e., in a case where the controller 70 has not received a status notification signal even once or in a case where the controller 70 has not received a new status notification signal in the predetermined amount of time t2 or longer since receiving a status notification signal), the controller 70 advances to step S206. On the other hand, in a case where the determination is YES (i.e., in a case where the controller 70 has normally received a status notification signal), the controller 70 advances to step S207.

In step S206 the controller 70 prohibits operation of the indoor units 30 (i.e., does not allow stopped indoor units 30 to start operating or causes operating indoor units 30 to stop operating) in the target space SP in which is installed the adapter unit 50 from which the status notification signal is not being normally sent (i.e., the target space SP in which the ventilation unit 40 cannot be controlled normally). Furthermore, the controller 70 has the remote controller 35 and the central management device 38 display information identifying the target space SP in which the ventilation unit 40 cannot be controlled normally and information indicating that operation of the indoor units 30 in that target space SP is prohibited. Thereafter, the controller 70 advances to step S207.

In step S207 the controller 70 determines whether or not an operation command has been input (i.e., whether or not a setting item such as an instruction to start operating, an instruction to stop operating, a set temperature designation, a set air volume designation, and an air direction designation has been input). In a case where the determination is NO (i.e., in a case where an operation command has not been input), the controller 70 returns to step S201. On the other hand, in a case where the determination is YES (i.e. in a case where an operation command has been input), the controller 70 advances to step S208.

In step S208 the controller 70 determines whether or not the operation command that was input is an operation command relating to the indoor units 30 installed in the target space SP in which the ventilation unit 40 cannot be controlled normally (i.e., whether or not the operation command that was input is an operation command relating to the target space SP in which communication is normally possible). In a case where the determination is NO (i.e., in a case where the operation command that was input is an operation command relating to the target space SP in which the ventilation unit 40 cannot be controlled normally), the controller 70 returns to step S201. On the other hand, in a case where the determination is YES (i.e., in a case where the operation command that was input is an operation command relating to the target space SP in which the ventilation unit 40 can be controlled normally), the controller 70 advances to step S209.

In step S209 the controller 70 executes processing corresponding to the operation command that was input. Thereafter, the controller 70 returns to step S201.

(6) Processing in Air Conditioning System 100

Figure 8:
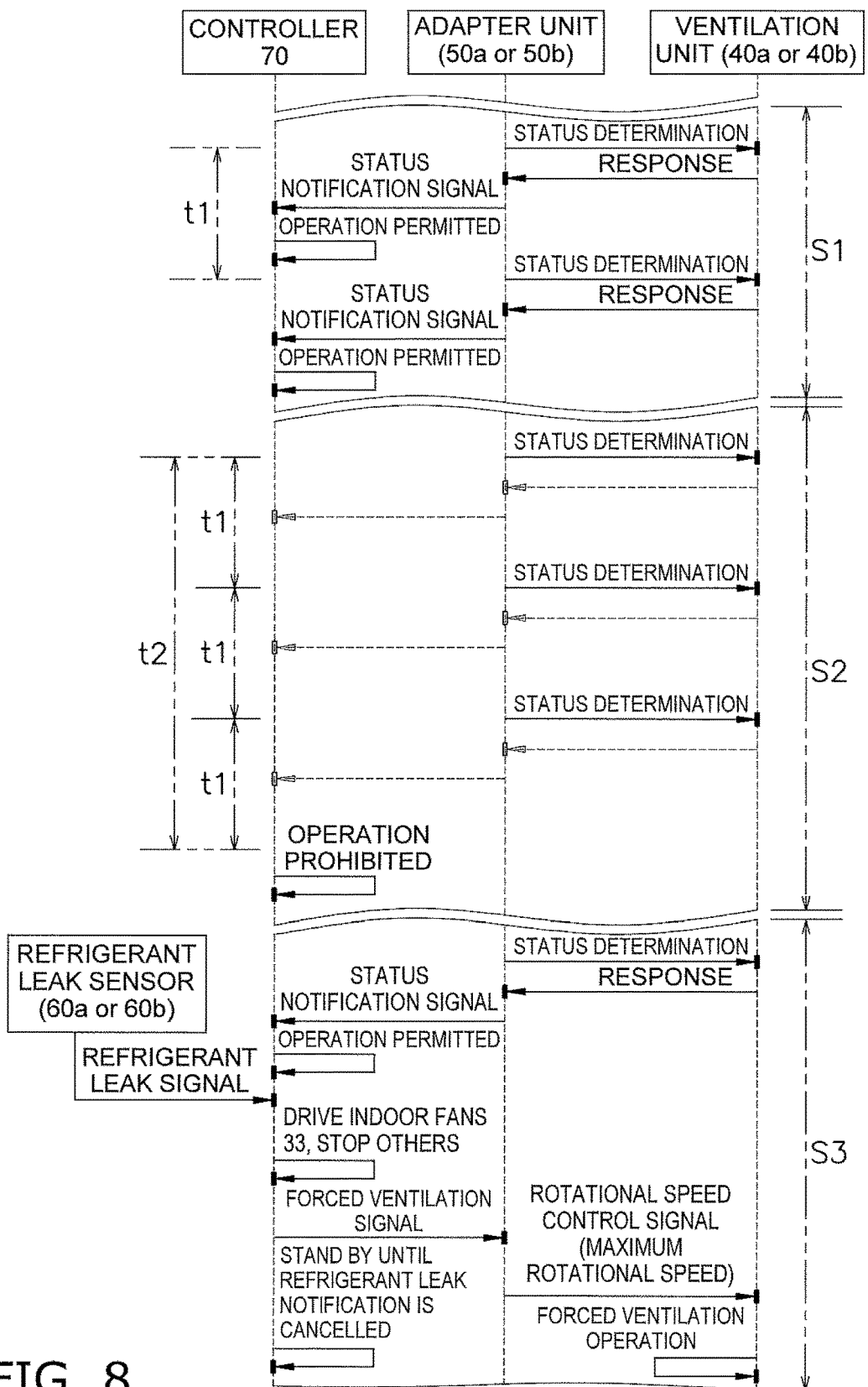
FIG. 8 is a sequence diagram schematically showing an example of processing performed in the controller, the adapter unit, and the ventilation unit.

FIG. 8 is a sequence diagram schematically showing an example of the processing performed in the controller 70, the adapter unit 50 (50*a* or 50*b*), and the ventilation unit 40 (40*a* or 40*b*).

As indicated in period 51 in FIG. 8, in the air conditioning system 100, the adapter unit 50 periodically (each time the predetermined amount of time t1 elapses) performs the status determination. In a case where, as a result of the status determination, the adapter unit 50 has determined that the ventilation unit 40 is normally controllable, the adapter unit 50 sends the status notification signal to the controller 70. The controller 70 receives the status notification signal, grasps that the ventilation unit 40 in the target space SP in which is installed the adapter unit 50 that was the source of the transmission is normally controllable, and permits operation of the indoor units 30 in that target space SP (i.e., the controller 70 raises the operation permitted/prohibited discrimination flag corresponding to the group to which those indoor units 30 belong).

As indicated in period S2 in FIG. 8, in the air conditioning system 100, in a case where the controller 70 has not received a new status notification signal in the predetermined amount of time t2 (here, 30 seconds) or longer since receiving the status notification signal from the adapter unit 50, the controller 70 prohibits operation of the indoor units 30 in the target space SP in which is installed the adapter unit 50 from which a new status notification signal is not being sent (i.e., the controller 70 does not raise or cancels the operation permitted/prohibited discrimination flag corresponding to the group to which those indoor units 30 belong). In S2 in FIG. 8, a state is shown in which no status notification signal is sent to the controller 70 because the ventilation unit 40 is not normally controllable (the ventilation unit 40 does not respond normally to the command from the adapter unit 50).

As indicated in period S3 in FIG. 8, in the air conditioning system 100, when the refrigerant leak signal is sent from the refrigerant leak sensor 60 (60*a* or 60*b*) to the controller 70, the controller 70 drives at the maximum rotational speed the indoor fans 33 in the target space SP in which is installed the refrigerant leak sensor 60 responsible for sending the refrigerant leak signal (i.e., the target space SP in which the refrigerant leakage is occurring). Furthermore, the controller 70 stops the driving of other actuators of the air conditioner 10 to thereby cause the refrigerant to stop circulating. Furthermore, the controller 70 sends the forced ventilation signal to the adapter unit 50. The adapter unit 50 that has received the forced ventilation signal sends the rotational speed control signal (designating that the rotational speed be set to maximum) to the ventilation unit 40. As a result, the ventilation unit 40 drives both the supply air fan 43 and the exhaust air fan 44 at the maximum rotational speed (maximum air volume), and ventilation is performed in the target space SP in which the refrigerant leakage is occurring. Furthermore, the controller 70 has the remote controller 35 and the central management device 48 display an indication to notify the user that a refrigerant leakage is occurring. This state continues until it is cancelled by the user or a serviceman.

(7) Characteristics of Air Conditioning System 100

(7-1)

In the air conditioning system 100, the adapter unit 50 periodically sends to the controller 70 the status notification signal indicating that the ventilation unit 40 is normally controllable. That is, the adapter unit 50 periodically sends the status notification signal to the controller 70 in a state in which the running of the ventilation unit 40 is controllable. Furthermore, in a case where the controller 70 does not receive the status notification signal, the controller 70 prohibits operation (i.e., performs control so as to not allow operation to start or so as to stop operation) of the indoor units 30 (the air conditioner 10) in the target space SP in which is installed the adapter unit 50 from which the status notification signal is not being sent normally (i.e., the target space SP in which the running of the ventilation unit 40 cannot be controlled normally). That is, the controller 70 does not allow operation of the air conditioner 10 to start in a case where a signal from the ventilation unit 40 that includes the ventilation fans 43 and 44 for ventilation and ventilates the target space SP is not input to the controller 70 (here, a case where the controller 70 does not receive the status notification signal).

Because of this, the status notification signal is not sent to the controller 70 in a case where the ventilation unit 40 is not properly installed in the target space SP, a case where communication with the ventilation unit 40 is not performed normally, or a case where the ventilation unit 40 will not run mechanically normally. That is, by establishing a state in which the signal from the ventilation unit 40 is input to the controller 70, it is ensured that connection of the electrical communication system between the air conditioner 10 and the ventilation unit 40 is reliably done at the installation site. As a result, operation of the air conditioner 10 is performed only in a case where the running of the ventilation unit 40 is controllable, regardless of whether or not the ventilation unit 40 is installed independently of the air conditioner 10 in the target space SP. That is, in a situation where it is not envisioned that ventilation will be reliably performed when refrigerant leakage has occurred, operation of the air conditioner 10 is not done. Thus, operation of the air conditioner 10 can be performed in a state in which there is reliably established a countermeasure such as the ventilation unit 40 being operated when the refrigerant has leaked, and safety and security with respect to refrigerant leakage are reliably ensured.

In particular, here, the refrigerant contained in the refrigerant circuit RC is mildly flammable, combustible, or toxic, so unless there is done a countermeasure such as the ventilation unit 40 being operated when the refrigerant has leaked in the target space SP, there is the concern that the flammable concentration or the toxicity limit concentration will end up being exceeded and that an ignition accident or a poisoning accident will occur. However, in the embodiment, when installing the multi-room air conditioner 10, operation of the air conditioner 10 is performed only in a state in which it is certain that ventilation will be performed by the operation of the ventilation unit 40 when the refrigerant has leaked at the installation site, so the occurrence of an ignition accident or a poisoning accident caused by leakage of the refrigerant can be reliably controlled.

(7-2)

In the air conditioning system 100, the adapter unit 50 is configured separately from the ventilation unit 40, which includes the supply air fan 43, the exhaust air fan 44, the drive components (the supply air fan motor 43a and the exhaust air fan motor 44a), and the body frame 41. Because the adapter unit 50 is configured separately from the ventilation unit 40 in this way, the air conditioning system 100 is configured in such a way that it can be applied by newly adding the adapter unit 50 even in a post-installation air conditioning system. As a result, versatility is improved, and safety and security can be reliably ensured even in a post-installation air conditioning system.

(7-3)

In the air conditioning system 100, the ventilation unit 40 has the fan drive control component 45, which supplies the drive voltage for the supply air fan 43 and the exhaust air fan 44, and the connection terminal 451, which is electrically connected to the adapter unit 50, and the fan drive control component 45 supplies the drive voltage on the basis of the control signal (rotational speed control signal) that has been input via the connection terminal 451. Because of this, the adapter unit 50 can easily be additionally installed in a post-installation air conditioning system.

(7-4)

In the air conditioning system 100, the controller 70 sends signals (e.g., the signal to start the forced ventilation operation, etc.) to the adapter unit 50, and the adapter unit 50 controls the running of the ventilation unit 40 on the basis of the signals it has received. Because the air conditioning system 100 is configured in this way, the running of the ventilation unit 40 can be controlled remotely using an existing transmission path of the air conditioner 10, and safety and security can be ensured while suppressing cost.

(7-5)

In the air conditioning system 100, by sending the signals the controller 70 controls (group controls) the running of the ventilation unit 40 in conjunction with the running of the indoor unit 30 associated with the ventilation unit 40. Because of this, it becomes possible to operate the ventilation unit in conjunction with the running of the air conditioner 10 in accordance with the situation, and convenience is improved.

(7-6)

In the air conditioning system 100, the controller 70 is configured to divide the plural indoor units 30 and the plural ventilation units 40 into groups on the basis of the target spaces SP in which the devices are installed, so as to be able to collectively control (group control) the indoor units 30 and the ventilation units 40 by group. Because of this, it becomes possible to generally control the indoor units 30 and the ventilation units 40, and convenience is improved.

Furthermore, safety and security are reliably ensured even in a configuration where the multi-room air conditioner 10 having the plural indoor units 30 and the ventilation units 40 are installed independently of each other.

(7-7)

In the air conditioning system 100, a transmission path (i.e., the network NW) of the status notification signal is configured as a result of the controller 70 and the adapter unit 50 being electrically connected to each other by the communication line CB1 or CB2 (i.e., the communication lines interconnecting the indoor units 30 and the remote controllers 35). In this way, a communication network is constructed using an existing communication line of the air conditioner 10 in the target space SP, and cost pertaining to the construction of the communication network is controlled.

(8) Example Modifications

The embodiment can be appropriately modified as described in the following example modifications. It should be noted that each of the example modifications may be combined with the other example modifications and applied to the extent that no incompatibilities arise.

(8-1) Example Modification A

In the embodiment, a case was described where there were two target spaces SP (SP1 and SP2). However, the number of target spaces SP may also be three or more, or may also be one.

Furthermore, two indoor units 30 and one ventilation unit 40 were installed in each target space SP. However, the number of indoor units 30 installed in each target space SP may also be one, or may also be three or more. Furthermore, the number of ventilation units 40 installed in each target space SP may also be two or more. In this case, it suffices for the adapter unit 50 to be appropriately installed in accordance with the number of ventilation units 40.

(8-2) Example Modification B

In the embodiment, the ventilation unit 40 had two ventilation fans (the supply air fan 43 and the exhaust air fan 44). However, it is not invariably necessary for the ventilation unit 40 to have two ventilation fans. That is, the ventilation unit 40 may also have just one ventilation fan. In this case, it suffices to do away with one of the air flow paths (the supply air flow path 41a and the exhaust air flow path 41b) inside the body frame 41.

Furthermore, the ventilation unit 40 included the heat exchanger 42, but the heat exchanger 42 is not invariably necessary and can be appropriately omitted.

Furthermore, sirocco fans were employed as the ventilation fans, but other fans such as propeller fans, for example, may also be employed as the ventilation fans.

Furthermore, it is not invariably necessary for the ventilation unit 40 to be installed in the space behind the ceiling of the target space SP, and the installation of the ventilation unit 40 is not particularly limited so long as the ventilation unit 40 is capable of ventilating the target space SP. For example, the ventilation unit 40 may also be installed behind the wall or under the floor of the target space SP. Furthermore, the ventilation unit 40 may also be installed in, for example, a machine room that communicates through a duct or the like with the target space SP.

(8-3) Example Modification C

In the embodiment, the ventilation unit 40 had the fan drive control component 45 including an inverter. However, in the ventilation unit 40, it is not invariably necessary for the fan drive control component 45 to include an inverter. That is, a unit incapable of adjusting the rotational speed of the ventilation fan may also be employed as the ventilation unit 40. In this case, the rotational speed control signal becomes a signal that switches between powering on/off the ventilation unit 40.

(8-4) Example Modification D

Figure 9:
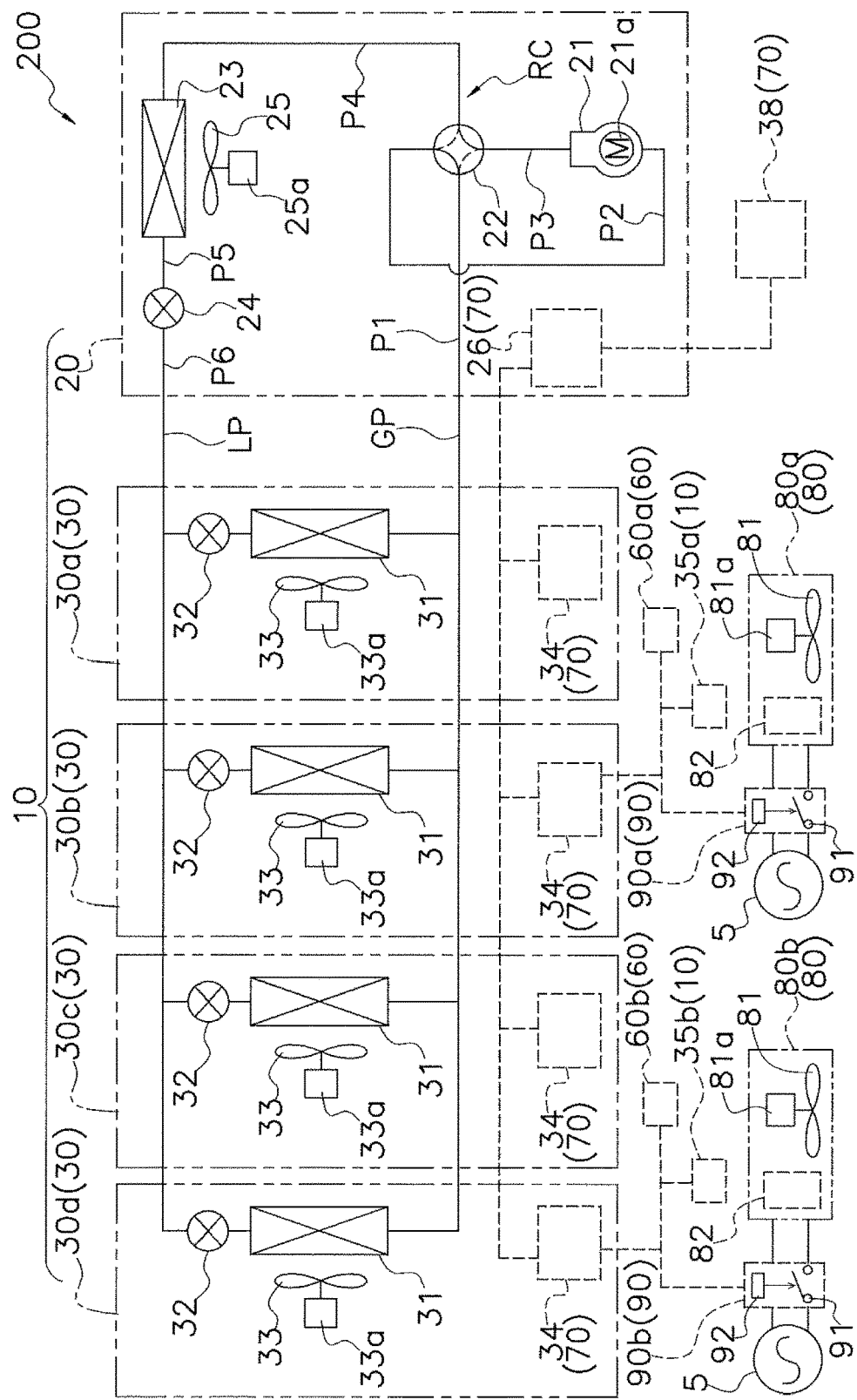
FIG. 9 is a schematic diagram showing the refrigerant circuit and the transmission path configured in the air conditioning system pertaining to example modification D.

The air conditioning system 100 of the embodiment may also be configured like an air conditioning system 200 shown in FIG. 9. The air conditioning system 200 will be described below. It should be noted that description regarding parts common to the air conditioning system 100 will be omitted.

In the air conditioning system 200, ventilation units 80 (80a and 80b) are disposed instead of the ventilation units 40 (40a and 40b), and adapter units 90 (90a and 90b) are disposed instead of the adapter units 50 (50a and 50b).

Each ventilation unit 80 has one ventilation fan 81 and a ventilation fan motor 81a that corresponds to a drive component of the ventilation fan 81. Furthermore, the ventilation fan 81 has a drive circuit 82 (a fan drive control component) for the ventilation fan motor 81a.

The adapter units 90 are disposed between the commercial power supplies 5 and the ventilation units 80, and are connected in series to the commercial power supplies 5 and the ventilation units 80. That is, the adapter units 90 are disposed on power supply lines interconnecting the commercial power supplies 5 and the ventilation units 80.

The adapter units 90 have switch components 91 that cut off the power supplied from the commercial power supplies 5 to the ventilation fan motors 81a. The switch components 91 are semiconductor switches, such as transistors, or electromagnetic relays, for example. Furthermore, the adapter units 90 have switch control components 92 that supply drive voltages to the switch components 91 to open and close the switch components 91.

In the air conditioning system 200, by switching the state of the switch components 91 in the adapter units 90, the power supply lines are switched between being electrically connected to and disconnected from the ventilation units 80, and the ventilation fans 81 are switched between being powered on/off. Specifically, in a case where a command to start the ventilation operation has been input from the user or the controller 70, and in a case where a signal to start the forced ventilation operation has been received from the controller 70, the adapter units 90 control the switch components 91 to a closed state to drive the ventilation fans 81.

In the case according to this air conditioning system 200, it becomes even easier to newly add the adapter unit 90 serving as a ventilation control component in a post-installation air conditioning system. That is, it becomes possible to apply the adapter unit 90 to even the ventilation unit 80 that does not have the connection terminal 451 of the ventilation unit 40, and it becomes easy to newly add the adapter unit 90 serving as a ventilation control component without being limited to the model of the ventilation unit in a post-installation air conditioning system. Thus, versatility is further improved.

It should be noted that although in the air conditioning system 200 the switch components 91 of the adapter units 90 are disposed between the commercial power supplies 5 and the drive circuits 82, the switch components 91 may also be disposed in series with the drive circuits 82 and the ventilation fan motors 81a between the drive circuits 82 and the ventilation fan motors 81a.

(8-5) Example Modification E

Figure 10:
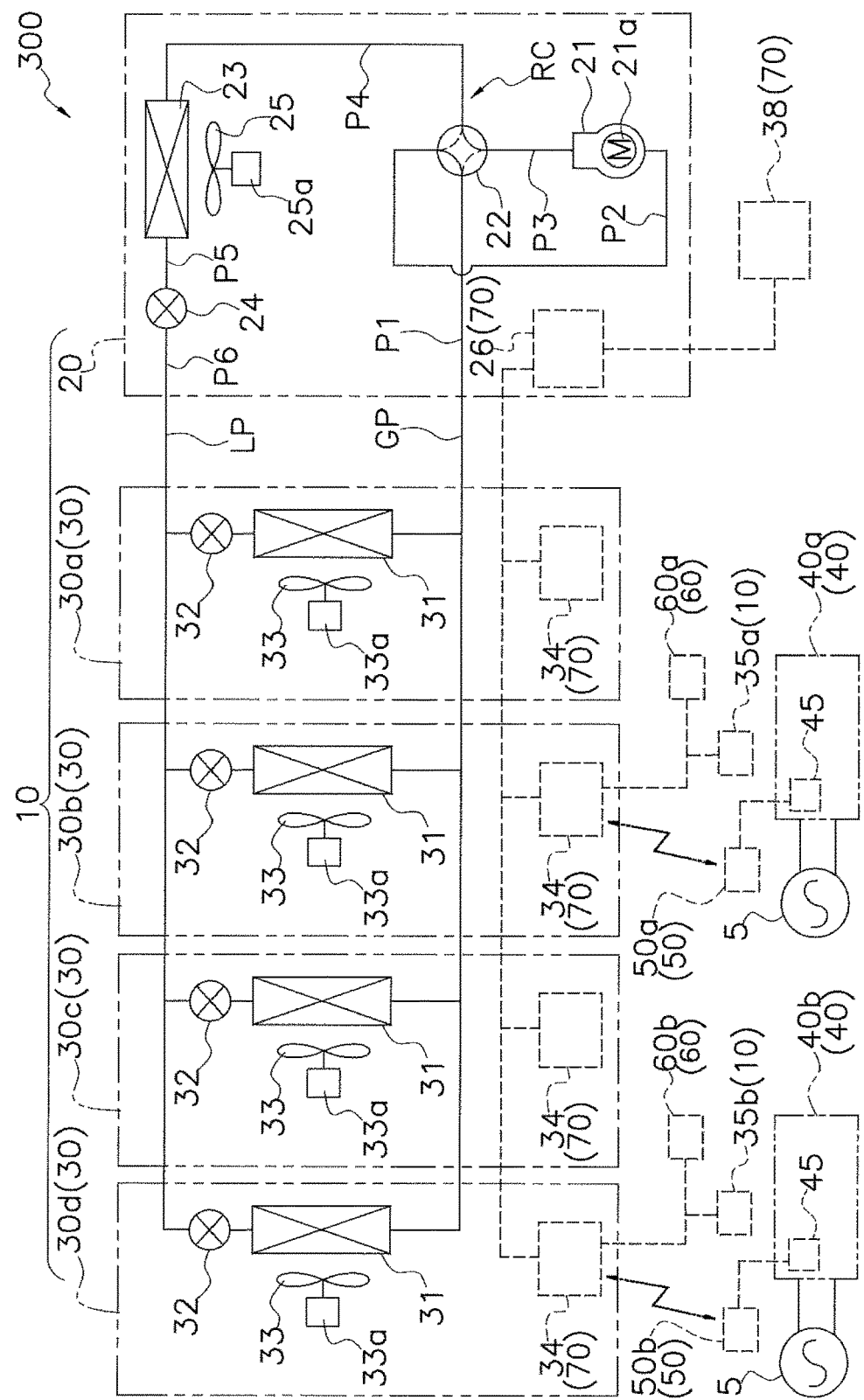
FIG. 10 is a schematic diagram showing the refrigerant circuit and the transmission path configured in the air conditioning system pertaining to example modification E.

The air conditioning system 100 of the embodiment may also be configured like an air conditioning system 300 shown in FIG. 10.

In the air conditioning system 300, the indoor unit control components 34 (the controller 70) and the adapter units 50 are not connected to each other by communication lines, but send signals to and receive signals from each other by wireless communication using radio or infrared. Other parts are substantially the same as in the air conditioning system 100.

In the case according to this air conditioning system 300, it is not necessary to route communication lines interconnecting the indoor unit control components 34 and the adapter units 50 in the target spaces SP, so it is easy to construct the network NW.

(8-6) Example Modification F

In the embodiment, the predetermined amount of time t1 was set to 1 minute and the predetermined amount of time t2 was set to 3 minutes. However, the predetermined amount of times t1 and t2 are not invariably limited to this and can also be appropriately changed. For example, the predetermined amount of time t1 may also be set to 30 seconds or may also be set to 10 minutes. Furthermore, the predetermined amount of time t2 may also be set to 1.5 minutes or may also be set to 30 minutes.

(8-7) Example Modification G

In the embodiment, independent remote controllers that power on/off and switch the rotational speed of the ventilation units 40 were not installed, but such remote controllers may also be separately installed. Furthermore, functions relating to such remote controllers may also be provided in the adapter units 50.

(8-8) Example Modification H

In the embodiment, one refrigerant leak sensor 60 was disposed in each target space SP. However, the embodiment is not limited to this, and two or more refrigerant leak sensors 60 may also be disposed in each target space SP.

Furthermore, the disposition of the refrigerant leak sensor 60 is not particularly limited so long as the refrigerant leak sensor 60 is disposed in a position in which it is capable of detecting refrigerant leakage in the target space SP. For example, the refrigerant leak sensor 60 may be disposed in the indoor unit 30, or may be disposed in the remote controller 35, or may be disposed in the ventilation unit 40, or may be disposed in the adapter unit 50.

(8-9) Example Modification I

In the embodiment, the adapter unit 50 was disposed independently in the target space SP. However, the disposition of the adapter unit 50 is not particularly limited so long as the adapter unit 50 is capable of communicating with the ventilation unit 40 and the controller 70. For example, the adapter unit 50 may be disposed inside the outdoor unit 20, or may be disposed inside the indoor unit 30, or may be disposed inside the remote controller 35, or may be disposed inside the central management device 38, or may be disposed inside the ventilation unit 40.

Furthermore, the adapter unit 50 may also be disposed independently in a remote location away from the target space SP. In this case, the adapter unit 50 is connected by a network such as a LAN or a WAN to the ventilation unit 40 and the controller 70.

(8-10) Example Modification J

In the embodiment, two groups (group 1 and group 2) were configured in the grouping table TB1, and two indoor units 30, one ventilation unit 40, and one refrigerant leak sensor 60 were included in each group. However, the number of groups configured in the grouping table TB1 is not particularly limited, and may also be one or may also be three or more. Furthermore, the numbers of indoor units 30, ventilation units 40, and refrigerant leak sensors 60 included in the groups are not particularly limited and can be appropriately changed.

(8-11) Example Modification K

In the embodiment, a case was described where the air conditioning system 100 is configured by additionally installing the adapter units 50 in the target spaces SP in which the air conditioner 10 and the ventilation units 40 are already installed. However, naturally the air conditioning system 100 may also be configured by also installing the adapter units 50 at the same time when newly installing the air conditioner 10 and the ventilation units 40 in the target spaces SP.

(8-12) Example Modification L

In the embodiment, the adapter unit 50 determined, in the status determination, whether or not the ventilation unit 40 was normally controllable by determining whether or not the running of the ventilation unit 40 with respect to a drive command or a rotational speed control signal was normal (i.e., whether or not the ventilation unit 40 is normally driven upon receiving a drive command in a case where the ventilation unit 40 is stopped, or whether or not the rotational speed of the supply air fan 43 or the exhaust air fan 44 matches the most recent rotational speed control signal that was sent).

However, the adapter unit 50 is not limited to this and, as processing pertaining to the status determination, may also be configured to periodically send a transmission signal to the ventilation unit 40, determine that communication with the ventilation unit 40 is normally possible in a case where there is a response from the ventilation unit 40 with respect to the transmission signal, and determine that communication with the ventilation unit 40 is not normally possible (i.e., the ventilation unit 40 cannot be controlled normally) in a case where there is no response from the ventilation unit 40 with respect to the transmission signal even when the adapter unit 50 sends the transmission signal a predetermined number of times (e.g., 3 times).

Furthermore, in a case where a sensor such as a temperature sensor (not shown in the drawings) is disposed in the ventilation unit 40, the adapter unit 50 may also be configured to determine that communication with the ventilation unit 40 is normally possible in a case where the adapter unit 50 is able to normally receive the detection result of the sensor and determine that communication with the ventilation unit 40 is not normally possible (i.e., the ventilation unit 40 cannot be controlled normally) in a case where the adapter unit 50 is not able to normally receive the detection result of the sensor.

(8-13) Example Modification M

In the embodiment, the controller 70 included the group setting component 74 and was configured to be able to perform group control in relation to the devices (the indoor units 30 and the ventilation units 40, etc.) included in the air conditioning system 100. However, in the air conditioning system 100, the group control is not invariably necessary and the group setting component 74 can be omitted.

(8-14) Example Modification N

Figure 11:
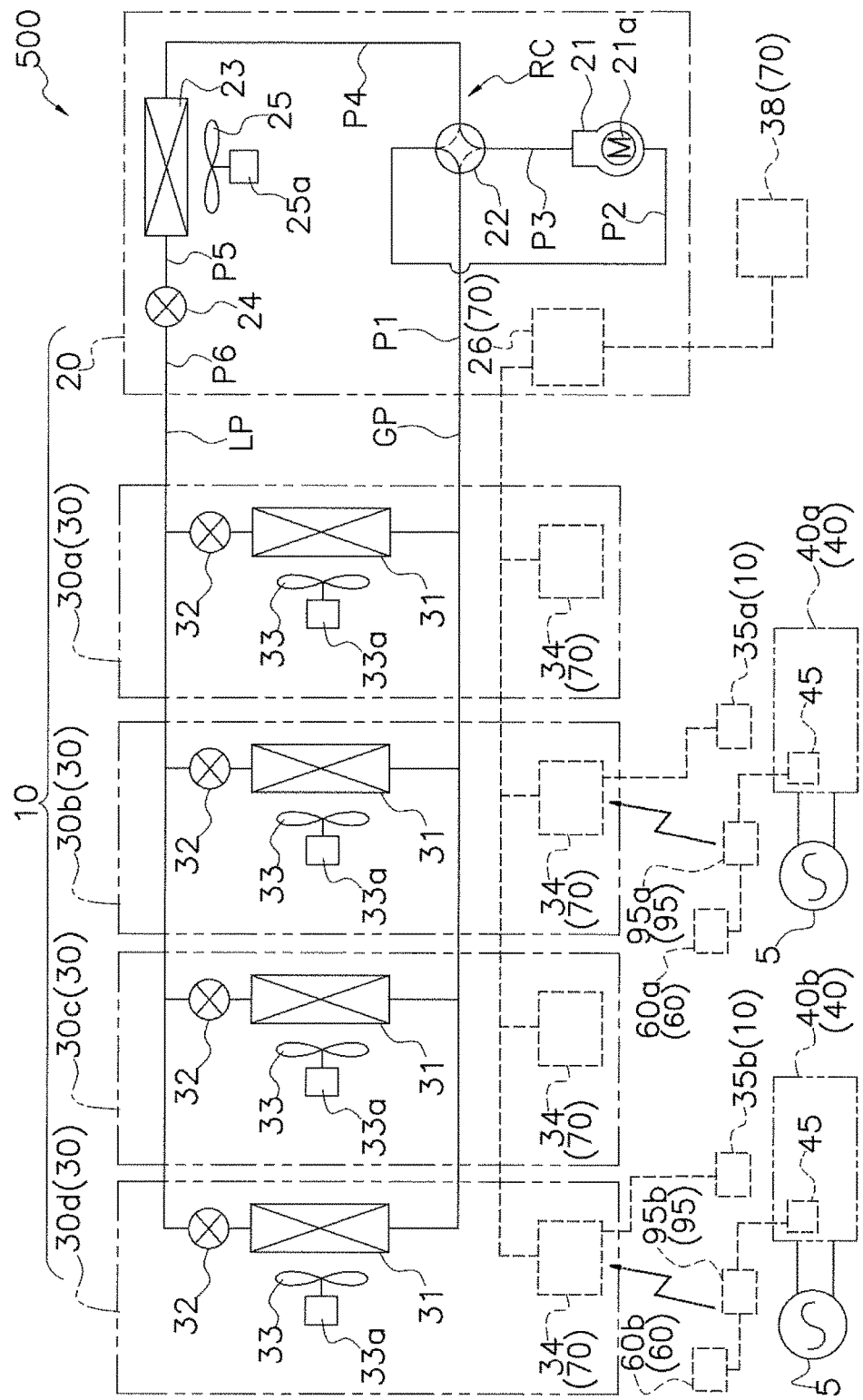
FIG. 11 is a schematic diagram showing the refrigerant circuit and the transmission path configured in the air conditioning system pertaining to example modification N.

The air conditioning system 100 of the embodiment may also be configured like an air conditioning system 500 shown in FIG. 11. The air conditioning system 500 will be described below. It should be noted that description regarding parts common to the air conditioning system 100 will be omitted.

FIG. 11 is a schematic diagram showing the refrigerant circuit RC and the transmission path configured in the air conditioning system 500.

In the air conditioning system 500, adapter units 95 (95a and 95b) are disposed instead of the adapter units 50 (50a and 50b). Furthermore, in the air conditioning system 500, the indoor unit control components 34 (the controller 70) and the adapter units 95 are not connected to each other by communication lines but perform wireless communication using radio or infrared.

In the air conditioning system 500, the adapter units 95 send signals (status notification signals) to the indoor unit control components 34 (the controller 70), and the indoor unit control components 34 (the controller 70) only receive the signals sent by the adapter units 95 and do not send signals to the adapter units 95. That is, in the air conditioning system 500, communication between the indoor unit control components 34 (the controller 70) and the adapter units 95 is not bidirectional as in the air conditioning system 100 but unidirectional.

In the air conditioning system 500, the refrigerant leak sensors 60 are not connected to the indoor unit control components 34 (the controller 70) but are electrically connected to the adapter units 95.

Also with the air conditioning system 500 configured in this way, it is possible to realize effects that are the same as those of the present invention.

That is, the adapter units 95 periodically send the status notification signal in a state in which the ventilation units 40 are normally controllable, so that in a case where the controller 70 does not receive the status notification signal, the controller 70 prohibits operation (i.e., performs control so as to not allow operation to start or so as to stop operation) of the indoor units 30 (the air conditioner 10) in the target space SP in which is installed the adapter unit 95 from which the status notification signal is not being sent normally (i.e., the target space SP in which the running of the ventilation unit 40 cannot be controlled normally).

As a result, operation of the air conditioner 10 is performed only in a case where the running of the ventilation unit 40 can be controlled, regardless of whether or not the ventilation unit 40 is installed independently of the air conditioner 10 in the target space SP. That is, in a situation where it is not envisioned that ventilation will be reliably performed when refrigerant leakage has occurred, operation of the air conditioner 10 is not done. Thus, safety and security with respect to refrigerant leakage are reliably ensured.

It should be noted that, in the air conditioning system 500, functional components corresponding to the forced ventilation control component 77 and the refrigerant leak discrimination flags (Fa and Fb) of the controller 70 are provided in the adapter units 95, and the adapter units 95 perform control relating to forced ventilation when refrigerant leakage has occurred in the target spaces SP.

That is, in the air conditioning system 500, when a refrigerant leak sensor 60 detects refrigerant leakage, the refrigerant leak sensor 60 sends a refrigerant leak signal not to the controller 70 but to the adapter unit 95 to which it is connected. When the adapter unit 95 receives the refrigerant leak signal, the adapter unit 95 drives the corresponding ventilation unit 40 at the maximum rotational speed (maximum air volume). As a result, the forced ventilation operation is also performed by the air conditioning system 500 when refrigerant leakage has occurred in the target spaces SP.

It should be noted that the air conditioning system 500 may also be configured in such a way that the indoor unit control components 34 (the controller 70) and the adapter units 95 are connected to each other by communication lines and wired communication is performed rather than wireless communication.

(8-15) Example Modification O

In the embodiment, the adapter units 50 were configured to be capable of communicating with the controller 70 as a result of being connected by the communication line CB1 or CB2 to the indoor unit control components 34. However, the adapter units 50 may also be configured to communicate with the controller 70 as a result of being connected by a wired or wireless network to an element other than the controller 70 (the remote controllers 35, the outdoor unit control component 26, or the central management device 38, etc.).

(8-16) Example Modification P

In the embodiment, as shown in FIG. 7, after the grouping setting and the generation (or updating) of the group table in steps S201 and S202 are done, the controller 70 determines in steps S205 and S206 whether to start or prohibit operation of the indoor units 30 (the air conditioner 10) depending on the status of the ventilation unit 40. That is, in the embodiment, the controller 70 determines whether or not a state is established in which the signals from the ventilation unit 40 are input to the controller 70 (here, whether or not the controller 70 is receiving the status notification signals), starts operation of the indoor units 30 (the air conditioner 10) in a case where the controller 70 is receiving the status notification signals, and prohibits operation of the indoor units 30 (the air conditioner 10) in a case where the controller 70 is not receiving the status notification signals.

However, regarding whether to start or prohibit operation of the indoor units 30 (the air conditioner 10), it is necessary to consider the status of the refrigerant leak sensor 60. The reason is because, as shown in FIG. 7 and FIG. 8, in the operation of the air conditioner 10 including the forced ventilation operation of the ventilation unit 40, it is premised that the refrigerant leak sensor 60 normally detects whether or not there is refrigerant leakage.

Figure 12:
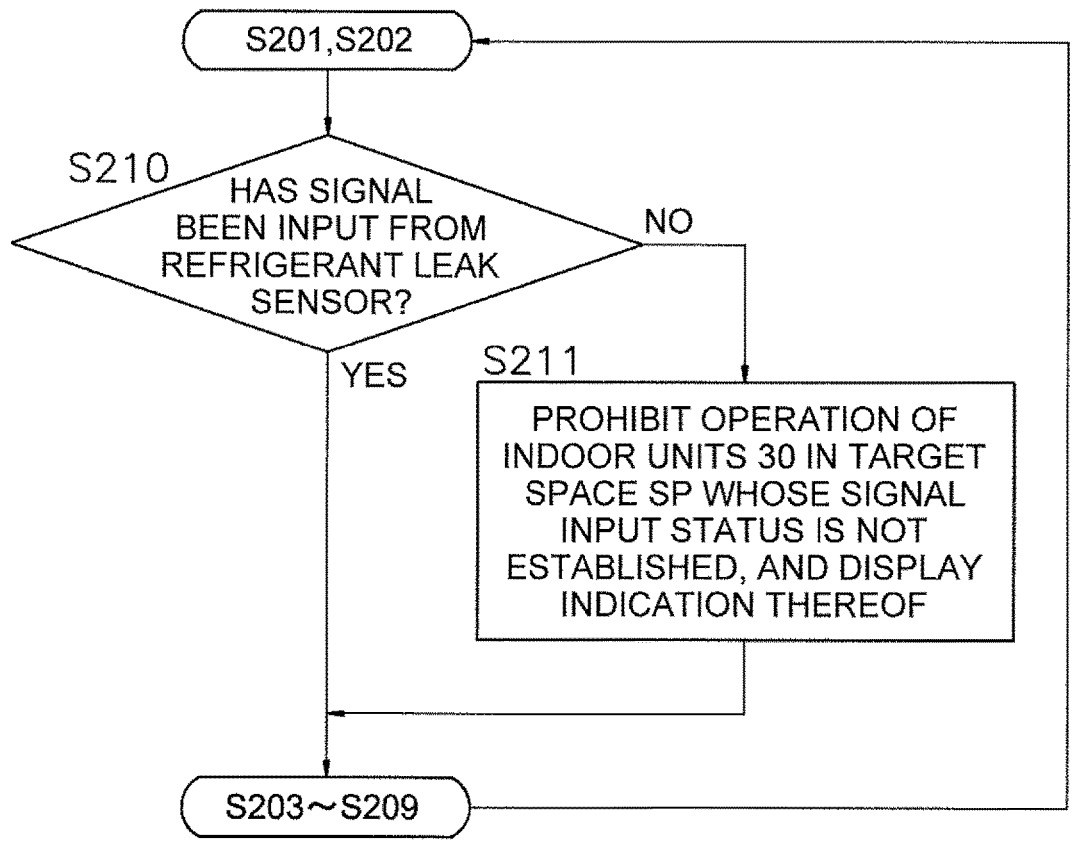
FIG. 12 is a flowchart showing a flow of processing performed by the controller in the air conditioning system pertaining to example modification P.

Therefore, here, as shown in FIG. 12, after the grouping setting and the generation (or updating) of the group table in steps S201 and S202 have been done, the controller 70 determines in step S210 whether or not a state is established in which a signal from the refrigerant leak sensor 60 is input to the controller 70. For this determination, whether or not there is a break in the line between the refrigerant leak sensor 60 and the controller 70 may be utilized, or, in a case where the refrigerant leak sensor 60 has the same communication function as the ventilation unit 40, whether or not the controller 70 is receiving a status notification signal indicating that the refrigerant leak sensor 60 is running normally may be utilized. Additionally, in a case where a state is established in which the signal from the refrigerant leak sensor 60 is input to the controller 70, in step S211 the controller 70 starts operation of the indoor units 30 (the air conditioner 10), and in a case where this is not so the controller 70 prohibits operation of the indoor units 30 (the air conditioner 10). Thereafter, the controller 70 performs the processing of steps S203 to S209 including the determination of whether or not there is a status notification signal from the ventilation unit 40.

Because of this, by establishing a state in which the signal from the refrigerant leak sensor 60 is input to the controller 70, connection of the electrical communication system between the air conditioner 10 and the refrigerant leak sensor 60 is reliably done at the installation site, and safety and security with respect to refrigerant leakage are reliably ensured.

INDUSTRIAL APPLICABILITY

The present invention is applicable to an air conditioning system including an air conditioner that cools or heats a target space by causing refrigerant to circulate in a refrigerant circuit during operation.

REFERENCE SIGNS LIST

5: Commercial Power Supply
10: Air Conditioner
20: Outdoor Unit
26: Outdoor Unit Control Component
30 (30a to 30d): Indoor Units
34: Indoor Unit Control Component
35 (35a, 35b): Remote Controllers
38: Central Management Device
40 (40a, 40b), 80: Ventilation Units
41: Body Frame (Frame)
41a: Supply Air Flow Path
41b: Exhaust Air Flow Path
42: Heat Exchanger
43: Supply Air Fan (Ventilation Fan)
43a: Supply Air Fan Motor
44: Exhaust Air Fan (Ventilation Fan)
44a: Exhaust Air Fan Motor
45: Ventilation Fan Control Component (Drive Component, Drive Voltage Supply Component)
50, 90: Adapter Units (Ventilation Control Components)
50a: First Adapter Unit
50b: Second Adapter Unit
51: Adapter Unit Storage Component
51a: Operation Command Discrimination Flag
51b: Air Volume Discrimination Flag
52: Adapter Unit Communication Component
53: Adapter Unit Input Component
54: Adapter Unit Control Component
55: Status Determination Component
60: Refrigerant Leak Sensors
60a: First Refrigerant Leak Sensor
60b: Second Refrigerant Leak Sensor
70: Controller (Air Conditioning Control Component, General Control Component)
71: Storage Component
71a, 71b: Status Discrimination Flags
72: Communication Component
73: Input Control Component
74: Group Setting Component
75: Actuator Control Component
76: Operation Permitting Component
77: Forced Ventilation Control Component
78: Display Control Component
81: Ventilation Fan
81a: Ventilation Fan Motor
82: Drive Circuit (Drive Component)
91: Switch Component
92: Switch Control Component
100, 200, 300, 500: Air Conditioning Systems
401: Intake Duct
402: Supply Air Duct
403: Removal Duct
404: Exhaust Air Duct
411: Electrical Component Box
451: Connection Terminal
CB1, CB2: Communication Lines
EA: Exhaust Air
Fa, Fb: Refrigerant Leak Discrimination Flags
G1, G2: Operation Permitted/Prohibited Discrimination Flags
GP: Gas Intercommunication Pipe
LP: Liquid Intercommunication Pipe
NW: Network (Transmission Path)
OA: Outdoor Air
RA: Room Air
RC: Refrigerant Circuit
SA: Supply Air
SP (SP1, SP2): Target Spaces
TB1: Grouping Table

CITATION LIST

Patent Literature

Patent Document 1: JP-A No. 2001-74283

The invention claimed is:

1. An air conditioning system comprising:
an air conditioner that includes an outdoor unit and an indoor unit that configures a refrigerant circuit together with the outdoor unit and is installed in a target space, with the air conditioner cooling or heating the target space by causing refrigerant to circulate in the refrigerant circuit during operation; and
an air conditioning controller that controls the running of the air conditioner,
wherein the air conditioning controller is configured to preclude operation of the air conditioner to start in a case where said air conditioning controller determines that a signal from a ventilation unit that includes a ventilation fan for ventilation and ventilates the target space or is not input to the air conditioning controller or in a case where said air conditioning controller determines that a signal from a refrigerant leak sensor that detects refrigerant leakage in the target space is not input to the air conditioning controller.

2. The air conditioning system according to claim 1, further comprising a ventilation controller that is electrically connected to the ventilation unit and controls the running of the ventilation unit, wherein
in a case where the running of the ventilation unit is controllable, the ventilation controller sends a notification signal to the air conditioning controller, and
in a case where the air conditioning controller does not receive the notification signal, the air conditioning controller is configured to determine this to be a case where the signal from the ventilation unit is not input, and precludes operation of the air conditioner to start.

3. The air conditioning system according to claim 2, wherein
the ventilation unit further includes a drive component that drives the ventilation fan and a frame that retains the ventilation fan, and
the ventilation controller is configured separately from the ventilation unit.

4. The air conditioning system according to claim 2, wherein
the ventilation unit further includes a drive voltage supply component that supplies a drive voltage for the ventilation fan and a connection terminal that is electrically connected to the ventilation controller,
the ventilation controller outputs a control signal to the ventilation unit, and
the drive voltage supply component supplies the drive voltage on the basis of the control signal that has been input via the connection terminal.

5. The air conditioning system according to claim 2, wherein
the ventilation unit is supplied with drive power from a commercial power supply, and
the ventilation controller includes a switch component that is disposed on a power supply line interconnecting the ventilation unit and the commercial power supply and switches between electrically connecting and disconnecting the power supply line.

6. The air conditioning system according to claim 2, wherein
the air conditioning controller sends an electrical signal to the ventilation controller, and
the ventilation controller controls the running of the ventilation unit on the basis of the electrical signal it has received.

7. The air conditioning system according to claim 6, wherein by sending the electrical signal the air conditioning controller controls the running of the ventilation unit in conjunction with the running of the indoor unit associated with the ventilation unit.

8. The air conditioning system according to claim 7, wherein
the air conditioning system has a plurality of the indoor units and/or the ventilation units,
the air conditioning system further comprises a general controller that generally controls the running of the plural indoor units and/or the plural ventilation units,
each of the ventilation units is installed in the same target space as any of the indoor units, and
the general controller divides the plural indoor units and/or the plural ventilation units into plural groups and collectively controls the indoor units and the ventilation units by each of the groups.

9. The air conditioning system according to claim 2, wherein the ventilation controller sends the notification signal by wireless communication.

10. The air conditioning system according to claim 2, wherein the air conditioning controller and the ventilation controller are electrically connected to each other by a communication line that configures a transmission path of the notification signal.

11. The air conditioning system according to claim 3, wherein
the ventilation unit further includes a drive voltage supply component that supplies a drive voltage for the ventilation fan and a connection terminal that is electrically connected to the ventilation controller,
the ventilation controller outputs a control signal to the ventilation unit, and
the drive voltage supply component supplies the drive voltage on the basis of the control signal that has been input via the connection terminal.

12. The air conditioning system according to claim 3, wherein
the ventilation unit is supplied with drive power from a commercial power supply, and
the ventilation controller includes a switch component that is disposed on a power supply line interconnecting the ventilation unit and the commercial power supply and switches between electrically connecting and disconnecting the power supply line.

13. The air conditioning system according to claim 3, wherein
the air conditioning controller sends an electrical signal to the ventilation controller, and
the ventilation controller controls the running of the ventilation unit on the basis of the electrical signal it has received.

14. The air conditioning system according to claim 4, wherein
the air conditioning controller sends an electrical signal to the ventilation controller, and
the ventilation controller controls the running of the ventilation unit on the basis of the electrical signal it has received.

15. The air conditioning system according to claim 5, wherein
the air conditioning controller sends an electrical signal to the ventilation controller, and
the ventilation controller controls the running of the ventilation unit on the basis of the electrical signal it has received.

16. The air conditioning system according to claim 3, wherein the ventilation controller sends the notification signal by wireless communication.

17. The air conditioning system according to claim 4, wherein the ventilation controller sends the notification signal by wireless communication.

18. The air conditioning system according to claim 5, wherein the ventilation controller sends the notification signal by wireless communication.

19. The air conditioning system according to claim 6, wherein the ventilation controller sends the notification signal by wireless communication.

20. The air conditioning system according to claim 7, wherein the ventilation controller sends the notification signal by wireless communication.

* * * * *